(12) United States Patent
Masuhiro et al.

(10) Patent No.: US 7,580,402 B2
(45) Date of Patent: Aug. 25, 2009

(54) INTERNET PROTOCOL COMPLIANT PRIVATE BRANCH ELECTRONIC EXCHANGE AND A METHOD EXPANDING THE NUMBER OF CONTROLLED TERMINAL PORTS

(75) Inventors: Mao Masuhiro, Tokyo (JP); Yasuhiro Watanabe, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 977 days.

(21) Appl. No.: 10/409,139

(22) Filed: Apr. 9, 2003

(65) Prior Publication Data

US 2003/0202648 A1 Oct. 30, 2003

(30) Foreign Application Priority Data

Apr. 25, 2002 (JP) .............................. 2002-123344

(51) Int. Cl.
*H04L 12/66* (2006.01)
(52) U.S. Cl. .................... 370/352; 379/221.06; 379/231
(58) Field of Classification Search ................. 370/351, 370/352, 446; 379/219, 221.06, 231, 232
See application file for complete search history.

(56) References Cited

U.S. PATENT DOCUMENTS

| 5,533,018 | A | * | 7/1996 | DeJager et al. | ........... | 370/395.5 |
| 5,535,262 | A | * | 7/1996 | Kanzawa | ................. | 379/88.25 |
| 5,557,668 | A | * | 9/1996 | Brady | ................... | 379/212.01 |
| 5,729,601 | A | * | 3/1998 | Murai | ........................ | 379/269 |
| 5,784,371 | A | * | 7/1998 | Iwai | ............................ | 370/397 |
| 5,802,141 | A | * | 9/1998 | Kobayashi | .................... | 379/22 |
| 6,111,893 | A | * | 8/2000 | Volftsun et al. | ............. | 370/466 |
| 6,151,390 | A | * | 11/2000 | Volftsun et al. | ............. | 379/229 |
| 6,185,288 | B1 | * | 2/2001 | Wong | .......................... | 379/219 |
| 6,246,678 | B1 | * | 6/2001 | Erb et al. | ..................... | 370/352 |
| 6,333,931 | B1 | * | 12/2001 | LaPier et al. | ................ | 370/385 |
| 6,650,632 | B1 | * | 11/2003 | Volftsun et al. | ............. | 370/352 |
| 6,680,952 | B1 | * | 1/2004 | Berg et al. | ................... | 370/467 |
| 6,768,733 | B1 | * | 7/2004 | Shankar et al. | ............. | 370/352 |
| 6,839,341 | B1 | * | 1/2005 | Nakajima | .................... | 370/352 |
| 6,842,447 | B1 | * | 1/2005 | Cannon | ...................... | 370/352 |
| 6,954,454 | B1 | * | 10/2005 | Schuster et al. | ............. | 370/352 |
| 6,987,756 | B1 | * | 1/2006 | Ravindranath et al. | ...... | 370/352 |
| 7,085,279 | B1 | * | 8/2006 | Kumar et al. | ............... | 370/401 |

(Continued)

FOREIGN PATENT DOCUMENTS

JP 4-86140 3/1992

(Continued)

*Primary Examiner*—Hassan Kizou
*Assistant Examiner*—Brian T. O'Connor
(74) *Attorney, Agent, or Firm*—Young & Thompson

(57) ABSTRACT

The IP-PBX 1 includes a multimedia gateway controller 2 in which a call control data master table stores call control data for all terminals falling under the control of the IP-PBX and protocol handlers which are installed on a system bus 101 or expansion system bus 102 in a sufficient number for serving the number of circuits accommodated by the IP-PBX. On each of the protocol handlers, a microprocessor performs processing tasks corresponding to a load shared on it in interfacing with a given number of terminals, using a call control data slave table in its memory, call control protocol conversion function, fault-supervisory-processing function, call control protocol retransmission function, call control protocol transfer function, and terminal supervisory function.

10 Claims, 16 Drawing Sheets

U.S. PATENT DOCUMENTS 7,440,566 B2 * 10/2008 Masuhiro et al. ....... 379/221.04

FOREIGN PATENT DOCUMENTS

| | | |
|---|---|---|
| JP | 10-308777 | 11/1998 |
| JP | 2002-319961 | 10/2002 |
| JP | 2003-152809 | 5/2003 |
| JP | 2003-209621 | 7/2003 |

* cited by examiner

INTERNET PROTOCOL COMPLIANT PRIVATE BRANCH ELECTRONIC EXCHANGE AND A METHOD EXPANDING THE NUMBER OF CONTROLLED TERMINAL PORTS

BACKGROUND OF THE INVENTION

1. Field of the Invention

The present invention relates to an Internet Protocol compliant private branch electronic exchange and a method for use thereon for expanding the number of terminal ports to fall under the control of the exchange and its program. In particular, the invention relates to the method for expanding the number of terminal ports to fall under the control of the exchange, by which the number of terminal ports to be accommodated and controlled by the Internet Protocol compliant private branch electronic exchange can be expanded.

2. Description of the Related Art

In a prior art Internet Protocol compliant private branch electronic exchange [hereinafter referred to as "IP-PBX" (Internet Protocol-Private Branch eXchange)], a Multimedia Gateway Controller (MGC) that performs call control/processing tasks has Local Area Network (LAN) ports and connects these ports to the Internet, an intranet, or LAN. In this case, the LAN is a network that may be Ethernet (registered trademark).

Using the MGC, the IP-PBX conducts control of Internet Protocol (IP) compliant phones (IP phones) that may connect to the Internet or an intranet and a terminal adapter (IPTA: Internet Protocol Terminal Adapter) which accommodates terminals not compliant with IP and attaches IP to the terminals. The most prior art IP-PBXs have the MGC built on a server processor and, therefore, accommodates LAN interfaces via Peripheral Component Interconnect (PCI) bridges or the like.

A configuration example of the above IP-PBX is shown in FIG. 16. Referring to FIG. 16, a method for use on the above IP-PBX for expanding the number of ports to fall under the control of the IP-PBX will be described. The prior art IP-PBX includes an MGC 61 and the MGC 61 has a main processor (MP) 62, a memory 63 connecting to the main processor 62, and a call control data master table 631 created in the memory 63.

The main processor 62 connects to a LAN interface 64-1 through a system bus 500 and the LAN interface 64-1 connects to a switching hub 5-1 via a LAN 200. The switching hub 5-1 connects to a router 6 and connects to a network [for example, a Wide Area Network (WAN) 300].

On the other hand, IP compliant phones (hereinafter referred to as "IP phones") 7-1, 7-2 or an IP compliant terminal adapter (hereinafter referred to as "IPTA") 8 that accommodates non-IP phones 9-1, 9-2 connects to a switching hub 5-2 and the switching hub 5-2 connects to the router 6 and connects to the network (for example, WAN 300).

The main processor 62 of the MGC 61 generates IP packets in a packet format of Transmission Control Protocol/Internet Protocol (TCP/IP) or User Datagram Protocol (UDP) and the LAN interface 64-1 transmits the IP packets.

On the other hand, IP packets from the terminals being under the control of the IP-PBX, such as the IP phone 7-1, are received by the LAN interface 64-1, and the main processor 62 extracts call control data from the IP packets. In this case, the main processor 62 has a function of layer 2 retransmission. Alternatively, the LAN interface 64-1 may have the functions of conversion to a packet format of TCP/IP or UDP and layer 2 retransmission. In this case, the main processor passes call control data to the LAN interface 64-1 without converting it into IP packets and the LAN interface 64-1 converts it into IP packets. Thereby, packets of IP packet format are sent and received between the LAN interface 64-1 and the terminals being under the control of the IP-PBX, such as the IP phone 7-1.

In the IP-PBX configuration as described above, when expanding the number of terminals falling under the control of the IP-PBX, namely, the IP phones 7-1, 7-2 and the IPTA 8 that are accommodated by the IP-PBX 60, is performed, the number of increasable terminals to fall under the control of the IP-PBX is determined by the upper limit of the IP packet handling capacity of the LAN interface 64-1 or the upper limit of the processing capacity of the main processor 62. To spare the LAN interface 64-1 reaching the upper limit of its IP packet handling capacity and share the load, the number of LAN interfaces 64-2, 64-3, etc. may be increased as much as the predefined number of the interfaces with the LAN 200.

When the number of terminals to fall under the control of the IP-PBX can no longer be increased even by increasing the number of the LAN interfaces; that is, when the main processor 62 has reached the upper limit of its processing capacity, the processor performance must be enhanced to provide more processing capacity. When a single MGC has reached the limit of expanding the number of terminals to fall under the control of the IP-PBX, a plurality of MGCs may be installed to share the load.

One problem associated with the above-described method for expanding the number of terminal ports to fall under the control of the IP-PBX, which has heretofore been used, is as follows. To expand the number of terminals such as IP phones and IPTAs to fall under the control of the IP-PBX, even if the number of LAN interfaces has increased for load sharing to relieve a LAN interface from exceeding its IP packet handling capacity, the processor used as the main processor must be altered for performance enhancement adaptive to more quantity of additional terminals because processing by software is required for a system in which the main processor performs the functions of generating IP packets and layer 2 retransmission, resulting in a high cost of the MGC.

Another problem is that, if retransmission on the network often occurs, it affects the call control itself and causes call control delay. If the same services and functions as provided by conventional PBXs not compliant with IP are realized on IP phones and IPTAs, the call control data to be communicated between the main processor and the terminals being under the control of the IP-PBX generally increases. Also, the prior-art IP-PBX presents a problem of increase in its cost when increasing the number of expandable terminal ports to fall under the control of the IP-PBX (with increase in the processing capacity of the main processor).

If the LAN interfaces have the functions of conversion to a packet format of TCP/IP or UDP and layer 2 retransmission, the main processor can be relieved from its overload state. However, if the terminals falling under the control of the IP-PBX are divided into some groups respectively using different protocols, the main processor still has the processing load in interpreting a plurality of different protocols. Under this condition, in order to expand the number of terminals to fall under the control of the IP-PBX, the main processor needs to increase its procession capacity (the processor must be altered for performance enhancement), resulting in the problem of a high cost of the MGC.

In order to process a plurality of different protocols, a proxy server for making protocol conversion may be installed within the LAN between the MGC and the terminals being under the control of the IP-PBX. A problem hereof is also the cost of the IP-PBX system that increases for the proxy server.

As described above, in the method for expanding the number of terminal ports to fall under the control of the IP-PBX in the prior art IP-PBX, there remain problems with scalability and flexibility for accommodating a plurality of different protocols.

SUMMARY OF THE INVENTION

An object of the present invention is to provide an Internet Protocol compliant private branch electronic exchange for use thereon for expanding the number of terminal ports to fall under the control of the exchange.

To this end, an Internet Protocol compliant private branch electronic exchange, includes a multimedia gateway controller which performs call control/processing tasks for said switching control;

a control interface for expanding a system bus which is connected to said multimedia gateway controller; and a plurality of protocol handlers which are installed on either said system bus or an expansion system bus provided by said control interface and execute, at least, protocol control processing for the call control/processing tasks of said multimedia gateway controller.

Advantageously, this configuration allows expansion in the number of terminal ports to fall under the control of the IP-PBX to be accomplished economically and in a scalable manner from a small scale to a large scale. Furthermore, since a call control protocol can be selected per terminal to fall under the control, the IP-PBX is capable of flexibly accommodating various types of terminals.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENT

An Internet Protocol compliant private branch electronic exchange embodying the present invention will be described with reference to FIG. 1 through FIG. 15.

Figure 1:
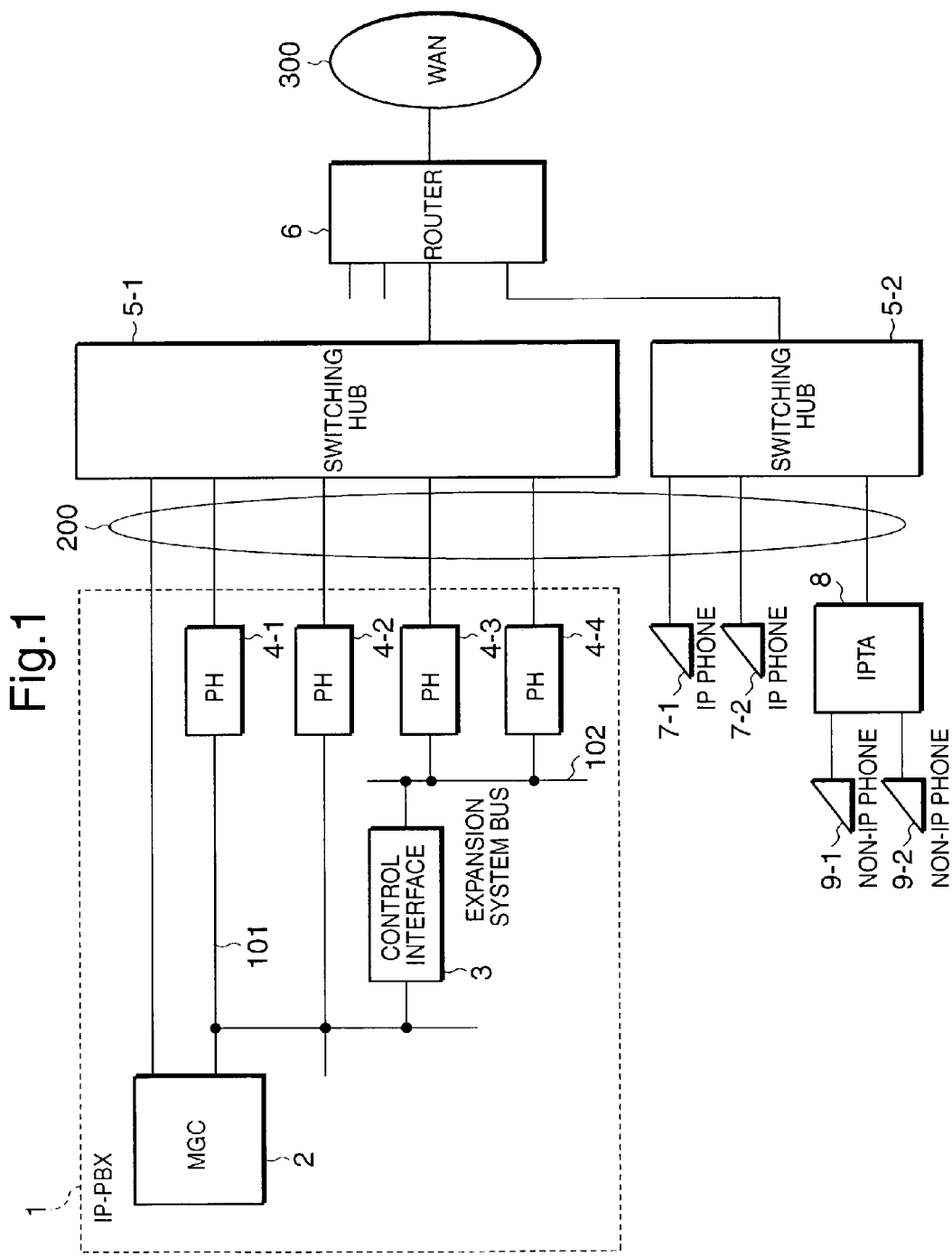
FIG. 1 is a block diagram showing an IP-PBX system configuration according to a first preferred embodiment of the present invention.

Preferred embodiments of the present invention will then be described with reference to the accompanying drawings. FIG. 1 is a block diagram showing a system configuration of an IP-PBX (Internet Protocol-Private Branch exchange) according to a first preferred embodiment of the present invention. In FIG. 1, the IP-PBX 1 is comprised of a Multimedia Gateway Controller (MGC) 2, a control interface 3, Protocol Handlers (PHs) 4-1 through 4-4, a system bus 101, and an expansion system bus 102.

The MGC 2 performs call control/processing tasks for switching control by the IP-PBX 1 and the control interface 3 or the PHs 4-1, 4-2 are connected to it through the system bus 101. The control interface 3 expands the system bus 101 of the MGC 2 and the PHs 4-3, 4-4 are connected to it through the expansion system bus 102.

The PHs 4-1 through 4-4 carry out protocol control/processing tasks including protocol conversion processing and the like for the call control and processing by the MGC 2 and connect to a switching hub 5-1 via a LAN 200. The switching hub 5-1 connects to a network [for example, a Wide Area Network (WAN) 300] via a router 6. The LAN 200 is a network that may be Ethernet (R).

On the other hand, IP compliant phones (hereinafter referred to as "IP phones") 7-1, 7-2 or an IP compliant terminal adapter [hereinafter referred to as "IPTA" (Internet Protocol Terminal Adapter)] 8 that accommodates non-IP phones 9-1, 9-2 connects to a switching hub 5-2 and the switching hub 5-2 connects to the network (for example, WAN 300) via the router 6.

By these connections, the MGC 2 is bound to be able to conduct call control for the IP phones 7-1, 7-2 or non-IP phones 9-1, 9-2 accommodated by the IPTA 8. In FIG. 1, a network including the switching hubs 5-1, 5-2 and the router 6 is simplified.

Figure 2:
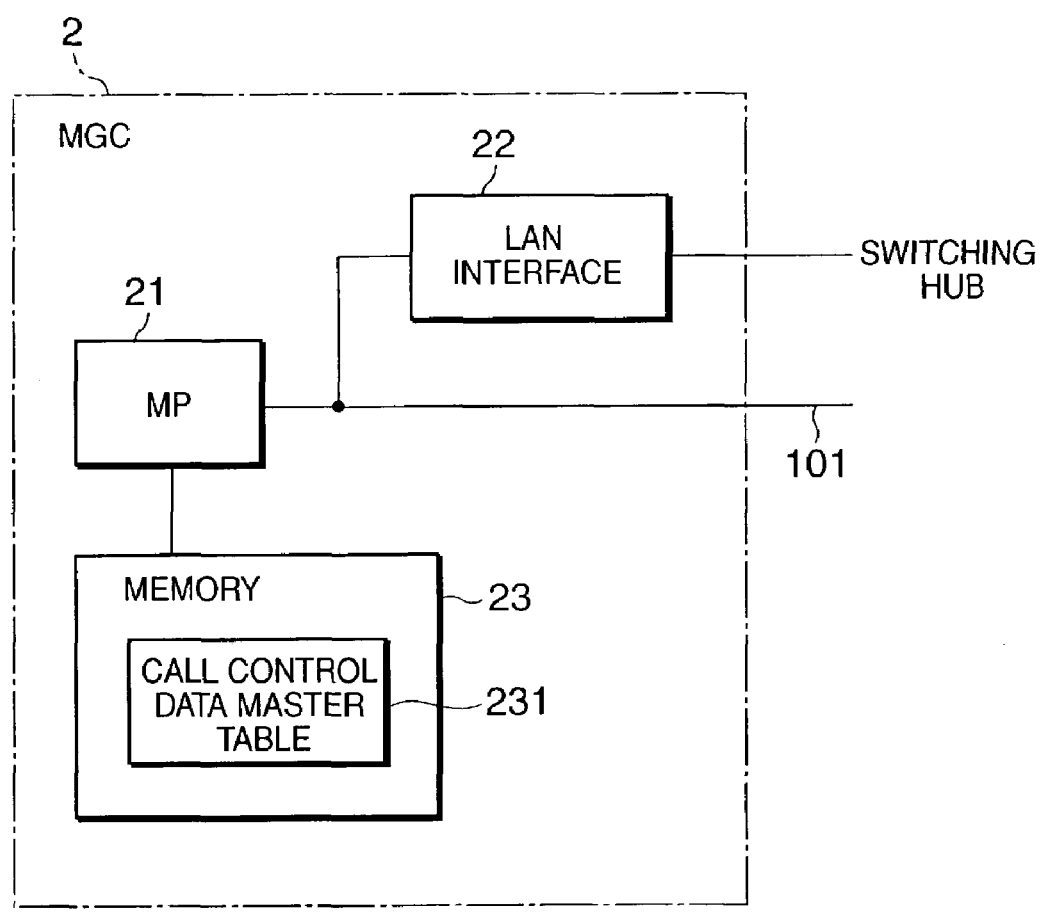
FIG. 2 is a block diagram showing a configuration of an MGC shown in FIG. 1.

FIG. 2 is a block diagram showing a configuration of the MGC 2 shown in FIG. 1. In FIG. 2, the MGC 2 is comprised of a main processor (MP) 21, a LAN (Local Area Network) interface 22, and a memory 23 connecting to the main processor 21 and a call control data master table 231 is created in the memory 23.

Figure 3:
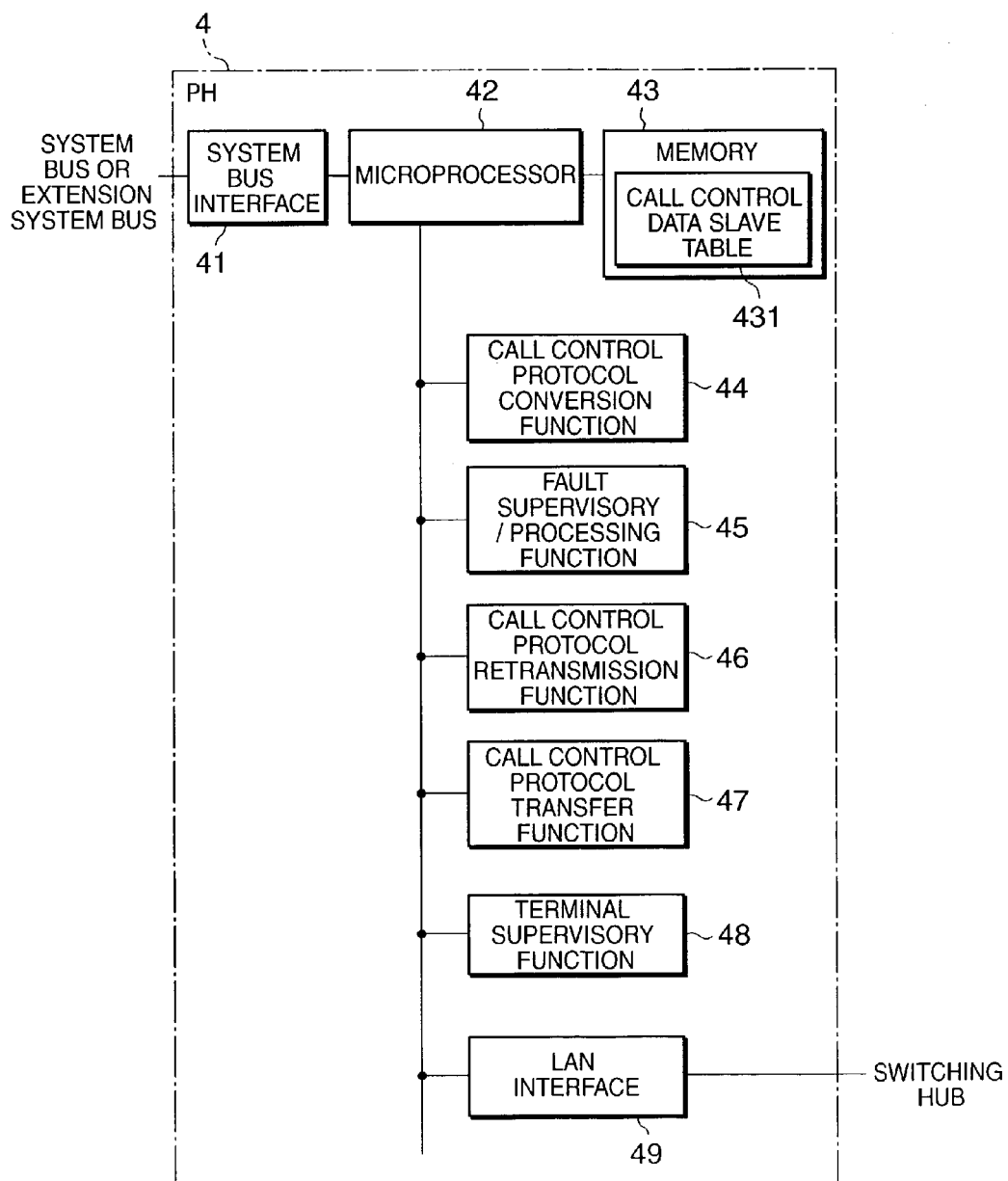
FIG. 3 is a block diagram showing a configuration of a PH shown in FIG. 1.

FIG. 3 is a block diagram showing a configuration of one of the PHs 4-1 through 4-4 shown in FIG. 1. In FIG. 3, a PH 4 is comprised of a system bus interface 41, a microprocessor 42, a memory 43, a call control protocol conversion function 44, a fault supervisory/processing function 45, a call control protocol retransmission function 46, a call control protocol transfer function 47, a terminal supervisory function 48, and a LAN interface 49. In the memory 43, a call control data slave table 431 is created.

The call control protocol conversion function 44 converts a call control protocol applied within the system of the MGC 2 into a call control protocol for communication with a terminal connecting to the LAN 200 and falling under the control of the IP-PBX and vice versa. The fault supervisory/processing function 45 and the call control protocol retransmission function 46 respectively execute fault event supervision, processing, and retransmission of layers 1 through 3. The call control protocol transfer function 47 transfers a call control protocol between the MGC 2 and a plurality of terminals that fall under the control of the IP-PBX. The terminal supervisory function 48 supervises the terminals being under the control of the IP-PBX.

In FIG. 3, the internal configuration of the PH 4, representative of the PHs 4-1 through 4-4, is shown, and it will be appreciated that the PHs 4-1 through 4-4 have the same configuration as the PH 4.

Referring to FIGS. 1 through 3, the IP-PBX according to the first preferred embodiment of the present invention will now be explained.

The IP-PBX 1 has the MGC 2 that performs call control/processing tasks. The MGC 2 comprises the main processor 21, LAN interface 22, and memory 23, and the memory 23 has the call control data master table 231 to store call control data such as the phone number, IP (Internet Protocol) address, and port number of a terminal being under the control of the IP-PBX.

From the main processor 21, the system bus 101 of the MGC 2 runs and the PHs 4-1, 4-2 are connected to the system bus 101. The LAN interface 22 connects to the switching hub 5-1 via the LAN 200.

The control interface 3 for expanding the system bus 101 is installed on the system bus 101 and the expansion system bus 102 runs from the control interface 3. The PHs 4-3, 4-4 are connected to the expansion system bus 102.

Inside a PH 4 (PH 4-3, 4-4), the system bus interface 41 connecting to the expansion system bus 102 connects to the microprocessor 42 that controls the PH 4. The microprocessor 42 operates with the memory 43 and the memory 43 includes the call control data slave table 431. The call control data slave table 431 is structured so that the upper limit to the number of terminals that can be controlled by the PH 4 will be greatest.

Also, to the microprocessor 42, the call control protocol conversion function 44, fault supervisory/processing function 45, call control protocol retransmission function 46, call control protocol transfer function 47, and terminal supervisory function 48 are connected. The call control protocol conversion function 44, fault supervisory/processing function 45, call control protocol retransmission function 46, call control protocol transfer function 47, and terminal supervisory function 48 may be embodied as either hardware components or software components. If these functions are embodied as software components, they are implemented in this way: after storing a program of code describing the functions into the memory 43, the microprocessor 42 executes the program.

Also, the microprocessor 42 connects to the LAN interface 49 and the LAN interface 49 is connected to the switching hub 5-1 via the LAN 200. The switching hub 5-1 is connected to the router 6.

On the other hand, the IP phones 7-1, 7-2 and the IPTA 8 that accommodates the non-IP phones 9-1, 9-2 and attaches IP to them are connected to the switching hub 5-2. The switching hub 5-2 is connected to the router 6.

By realizing the above-described configuration, the main processor 21 of the MGC 2 is able to control the IP phones 7-1, 7-2 and the IPTA 8 that accommodates the non-IP phones 9-1, 9-2 across the LAN through the use of the PHs 4-1 through 4-4.

Figure 4:
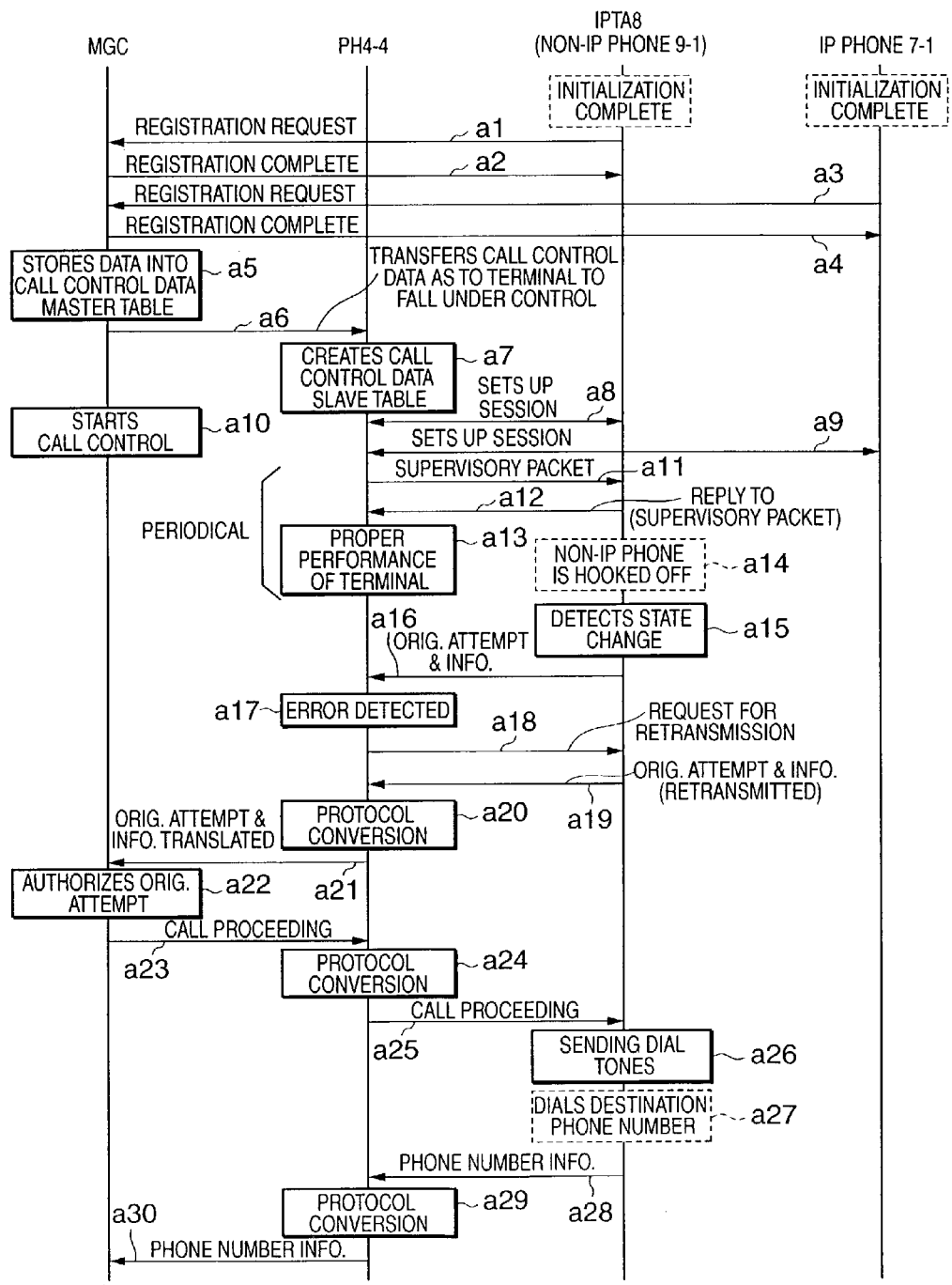
FIG. 4 is a sequence chart of operation of the IP-PBX according to the first preferred embodiment of the present invention.
Figure 5:
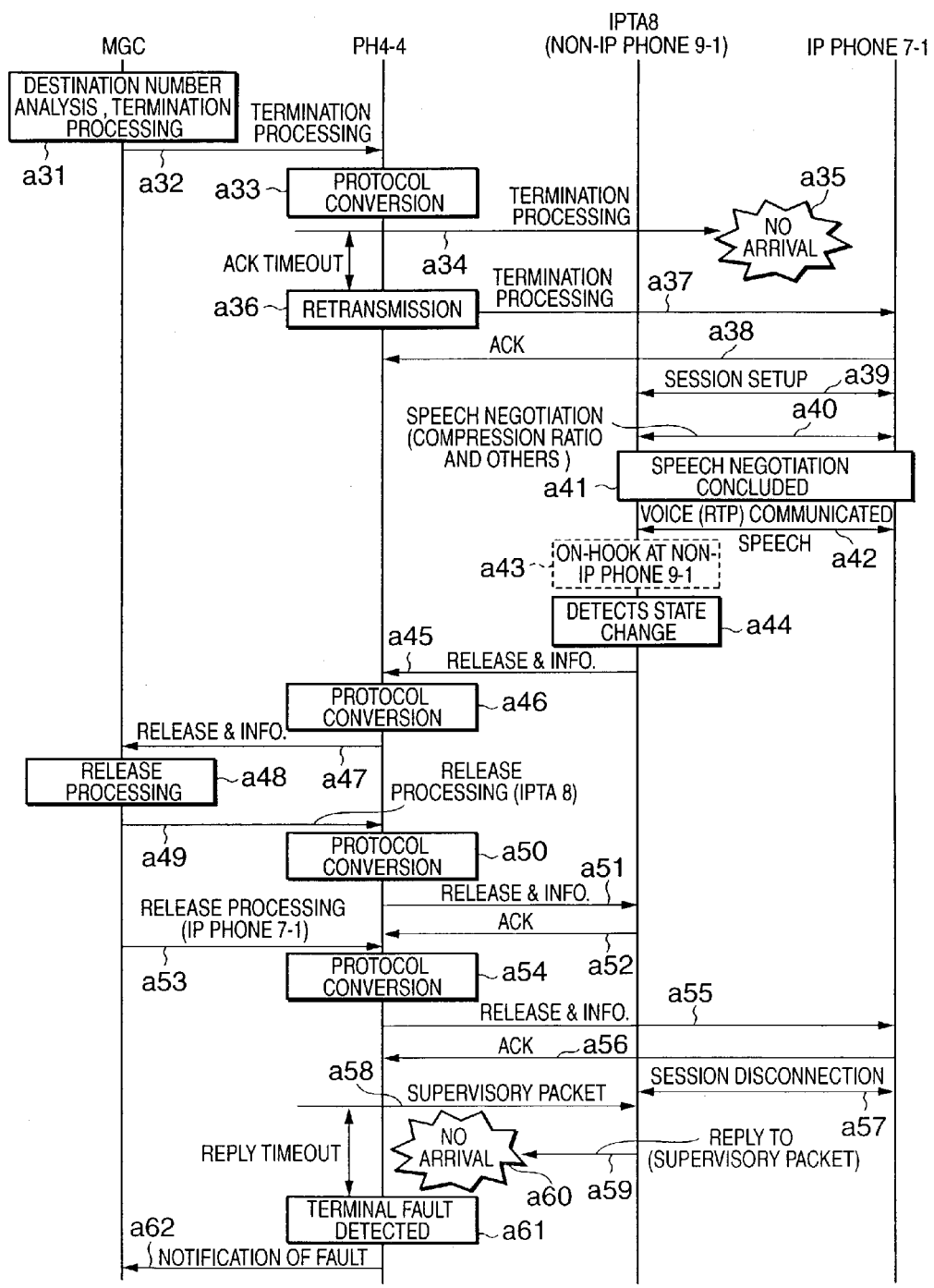
FIG. 5 is a sequence chart of operation of the IP-PBX according to the first preferred embodiment of the present invention.

FIG. 4 and FIG. 5 are sequence charts of operation of the IP-PBX 1 according to the first preferred embodiment of the present invention. Referring to FIGS. 1 through 5, operation of the IP-PBX 1 according to the first preferred embodiment of the present invention will be explained below.

The IP-PBX 1 is controlled by the MGC 2. Upon the connection of the IP phones 7-1, 7-2 or IPTA 8 to the LAN 200, registration requests from these terminals are received by the LAN interface 22 of the MGC 2 and then passed to the main processor 21 (a1 through a4 of FIG. 4). The main processor 21 obtains information such as IP address, port number, and terminal attribute from the terminals, namely, the IP phones 7-1, 7-2, and IPTA 8, adds information required for call control, such as terminal's phone number, and stores these data into the call control data master table 231 on the memory 23 (a5 of FIG. 4).

The main processor 21 determines which PH be used to control a terminal that obtained permission and registered with the IP-PBX and is to fall under the control of the IP-PBX. For example, when the main processor 21 selects a PH 4-4, it extracts the call control data appropriate for the PH 4-4 from the call control data master table 231 and transfers that data to the PH 4-4, and the data is copied to the call control data slave table 431 on the PH 4-4 (a6 of FIG. 4).

Upon receiving the call control data from the main processor 21 of the MGC 2, the microprocessor 42 of the PH 4-4 stores the data into the call control data slave table 431 (a7 of FIG. 4) and sets up a session with the IP phone 7-1, 7-2 or IPTA 8 that falls under the control of the IP-PBX through the LAN interface 49 (a8, a9 of FIG. 4). When the microprocessor 42 of the PH 4-4 has set up the session, the MGC 2 starts call control (a10 of FIG. 4). Thereafter, the terminal supervisory function 48 periodically transmits a packet for supervising the terminal such as the IP phone 7-1, 7-2, or IPTA 8 for proper performance (all through a13 of FIG. 4).

Then, the operation for controlling call origination and termination will be described with a scenario where a call from a non-IP phone 9-1 terminates on an IP phone 7-1. When the non-IP phone 9-1 is hooked off (a14 of FIG. 4), the IPTA 8 detects state change (a15 of FIG. 4) and transmits an origination attempt and information in an IP packet via the switching hub 5-2, router 6, switching hub 5-1 to the LAN interface 49 of the PH 4-4 (a16 of FIG. 4).

When the microprocessor 41 gets this origination attempt packet, using the call control protocol transfer function 47 (a19 of FIG. 4), it passes the origination attempt packet to the call control protocol conversion function 44 where the origination attempt and information in the IP packet are converted into a format as per the protocol supported by the main processor 21 (a20 of FIG. 4). The origination attempt and information translated by the protocol conversion are transferred to the main processor 21 through the system bus interface 41 (a21 of FIG. 4).

For the origination attempt packet, the call control protocol retransmission function 46 checks the IP packet received through the call control protocol transfer function 47 for an error, and, if an error is detected (a17 of FIG. 4), requests the IPTA 8 to retransmit the origination attempt packet (a18 of FIG. 4).

The main processor 21 authorizes the origination attempt and passes a call proceeding indication to the PH 4-4 (a22, a23 of FIG. 4). The PH 4-4 protocol converts the call proceeding instructions and generates an IP packet of call proceeding (a24 of FIG. 4) and then transmits the IP packet to the IPTA 8 (a25 of FIG. 4). Upon receiving the IP packet, the IPTA 8 gives a command to send dial tones to the non-IP phone 9-1 (a26 of FIG. 4).

When a destination phone number is input from the non-IP phone 9-1 (a27 of FIG. 4), the IPTA 8 transmits the phone number information in an IP packet to the PH 4-4 (a28 of FIG. 4). The PH 4-4 protocol converts the IP packet received from the IPTA 8 and transfers the phone number information translated by the protocol conversion to the main processor 21 (a20, a30 of FIG. 4).

From the call origination information, the main processor 21 looks for a PH to which to pass termination information, using the call control data master table 231 and transfers the termination information to the PH (in this case, it is assumed that the PH 4-4 is used) (a31, a32 of FIG. 5). The microprocessor 42 of the PH 4-4 receives the termination information for the IP phone 7-1 through the system bus interface 41.

The microprocessor 42 searches the call control data slave table 431 for the IP address, port number, etc. of the IP phone 7-1 to which the termination information is to be transmitted and the call control protocol conversion function 44 converts the termination information from the main processor 21 to data in an IP packet according to the network protocol. The IP packet and the above IP address, port number, etc. of the IP phone 7-1 are passed to the call control protocol transfer function 47 and the IP packet is transmitted through the LAN interface 49 (a33, a34 of FIG. 5).

The IP packet of termination information is passed through the switching hub 5-1, router 6, switching hub 5-2, and arrives at the IP phone 7-1, and then the ringer of the IP phone 7-1 sounds. If the PH 4-4 receives a retransmission request from the IP phone 7-1, the call control protocol retransmission function 46 retransmits the termination information (a35 through a37 of FIG. 5). A release process flow (a38 through a62 of FIG. 5) is the same as the call origination process and, therefore, its explanation is not repeated.

Moreover, as concerns call control data to be passed in the direction from the MGC 2 toward the IP phone, for example, if the specified number of a destination terminal falling under the control of the IP-PBX is not registered in the call control data slave table 431 of the PH 4-4, the fault supervisory/processing function 45 detects that and the microprocessor 42 warns the main processor 21.

Accordingly, the main processor 21 need not do IP packet generation, IP address and port number search, and retransmission control and its load reduces. Consequently, the main processor is bound to be able to control more terminals through the use of the PHs 4-1 through 4-4. By installing a plurality of PHs 4-1 through 4-4, load can be shared by them and the number of terminal ports to fall under the control of the IP-PBX can expand.

Particularly, transmitting same call control data to a plurality of terminals falling under the control of the IP-PBX is performed in the following procedure. To transmit one call control data to a specified terminal out of the above terminals, the call control protocol conversion function 44 converts the call control data into data in an IP packet according to the network protocol. The call control data slave table 431 on one of the PHs 4-1 through 4-4 is searched for the IP addresses and port numbers of the plurality of terminals falling under the control of the IP-PBX. The call control protocol transfer function 47 copies the above IP packet per terminal falling under the control of the IP-PBX and broadcasts the IP packets. Because such a broadcasting function can be realized, the load of the main processor 21 can be reduced.

Figure 6:
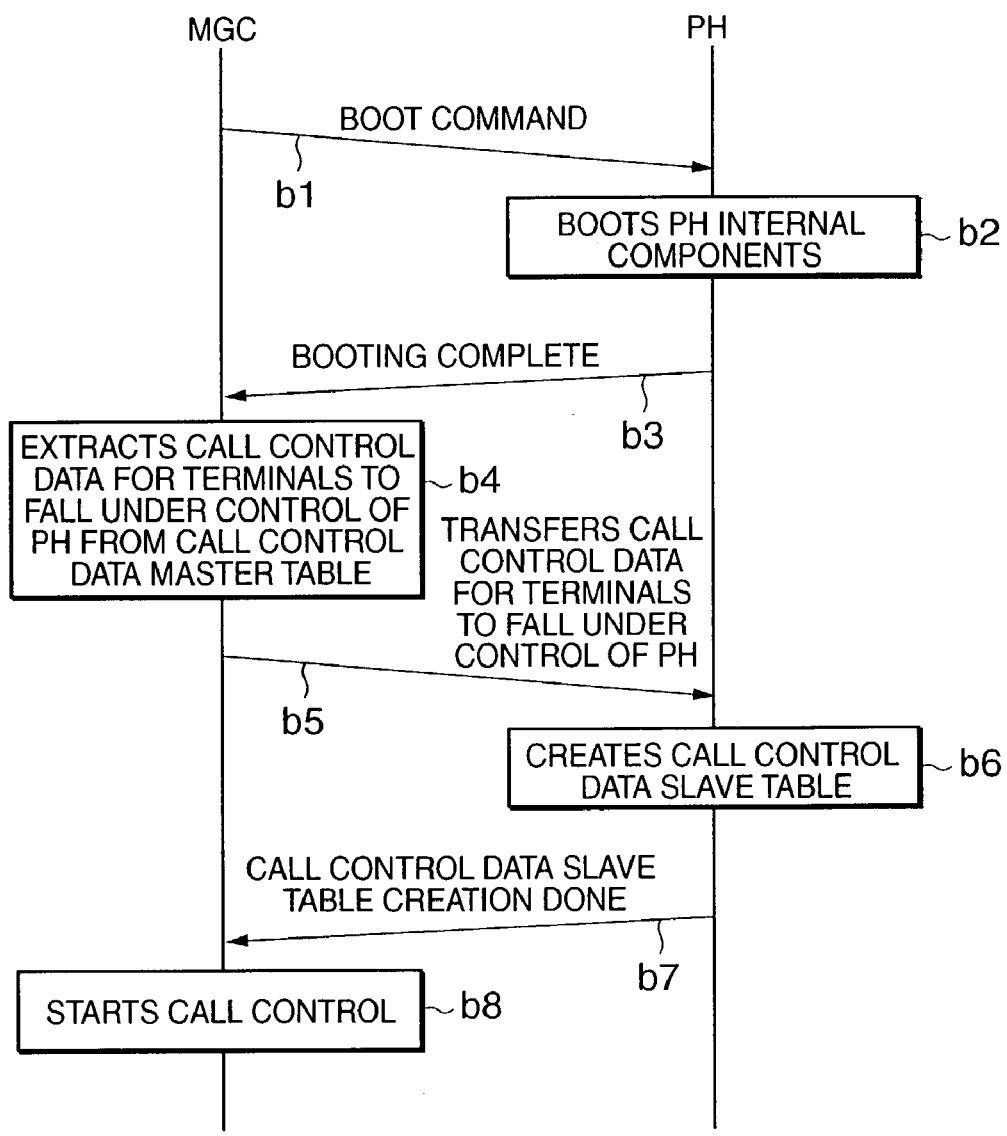
FIG. 6 is a sequence chart of operation of registering terminals to fall under the control of the IP-PBX with a PH of the IP-PBX according to the first preferred embodiment of the present invention.
Figure 7:
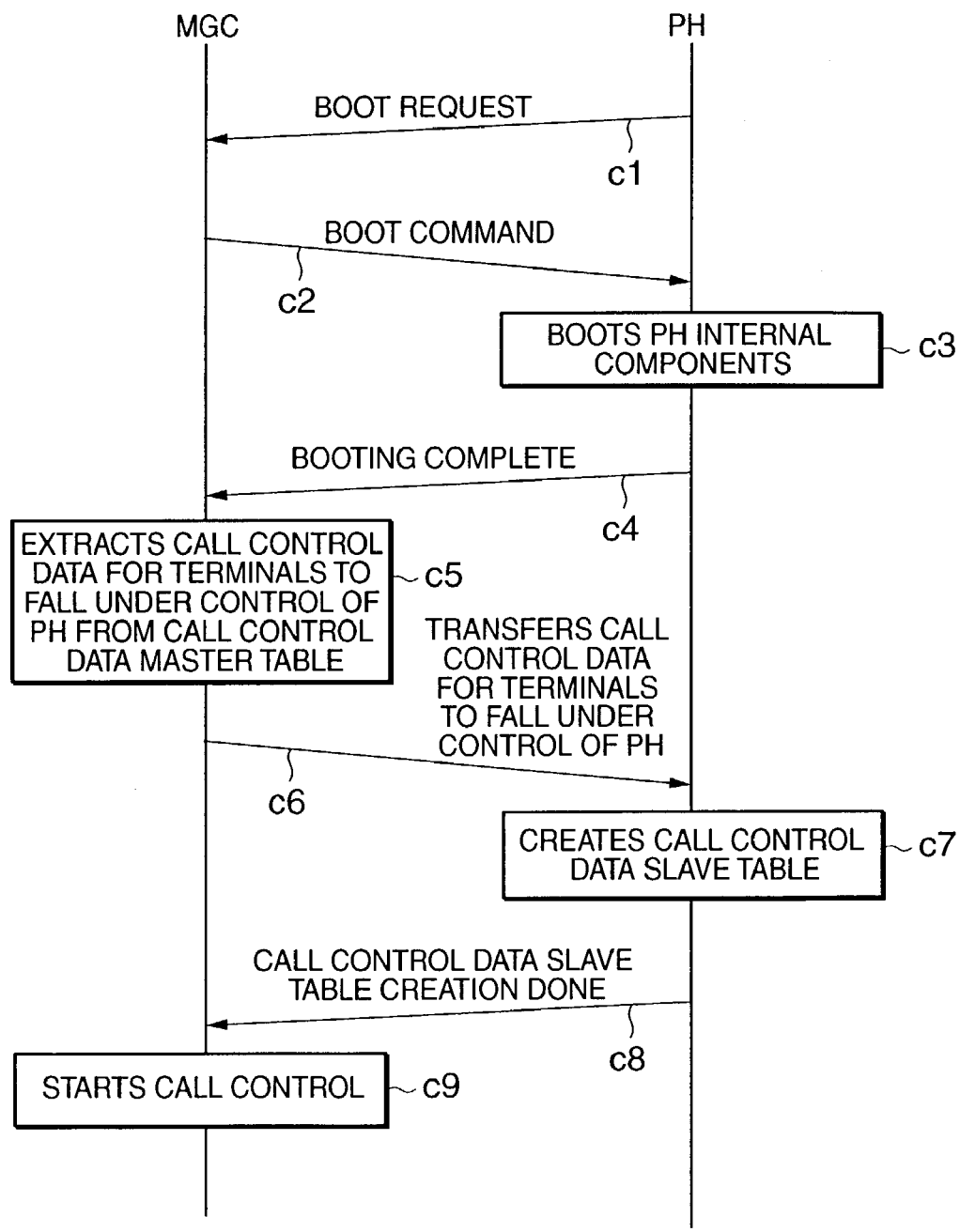
FIG. 7 is a sequence chart of operation of registering terminals to fall under the control of the IP-PBX with a PH of the IP-PBX according to the first preferred embodiment of the present invention.

FIG. 6 and FIG. 7 are sequence charts of operation of registering terminals to fall under the control of the IP-PBX with a PH of the IP-PBX according to the first preferred embodiment of the present invention. In other words, FIG. 6 and FIG. 7 illustrate the procedures of creating a call control data slave table on a PH 4 in the IP-PBX 1 according to the first preferred embodiment of the present invention. The procedure of FIG. 6 is used when the whole IP-PBX 1 is booted. The procedure of FIG. 7 is used when only a PH 4 is booted. Referring to FIGS. 1 through 3, 6, and 7, the operation of the IP-PBX 1 according to the first preferred embodiment of the present invention will now be explained.

As described in FIG. 6, whenever the whole IP-PBX 1 is booted, the MGC 2 issues a boot command to a PH 4 (b1 of FIG. 6). Having received the boot command, the PH 4 executes the booting of its internal components (b2 of FIG. 6) and notifies the MGC of the booting complete (b3 of FIG. 6).

Having received this notification, the MGC 2 extracts call control data for terminals to fall under the call control of the PH 4 from the call control data master table 231 (b4 of FIG. 6) and transfers that data to the PH 4 (b5 of FIG. 6).

Based on that data, the PH 4 creates a call control data slave table 431 (b6 of FIG. 6) and notifies the MGC 2 that it has created the call control data slave table (b7 of FIG. 6) Having received this result, the MGC 2 starts call control (b8 of FIG. 6).

On the other hand, as described in FIG. 7, whenever only a PH 4 is booted, the PH 4 issues a boot request to the MGC 2 (c1 of FIG. 7) and the MGC 2 issues a boot command to the PH 4 (c2 of FIG. 7). Having received the boot command, the PH 4 executes the booting of its internal components (c3 of FIG. 7) and notifies the MGC of the booting complete (c4 of FIG. 7).

Having received this notification, the MGC 2 extracts call control data for terminals to fall under the call control of the PH 4 from the call control data master table 231 (c5 of FIG. 7) and transfers that data to the PH 4 (c6 of FIG. 7).

Based on that data, the PH 4 creates a call control data slave table 431 (c7 of FIG. 7) and notifies the MGC 2 that it has created the call control data slave table (c8 of FIG. 7). Having received this result, the MGC 2 starts call control (c9 of FIG. 7).

As described above, when the whole IP-PBX 1 is booted or when a PH 4 is booted independently, the call control data for the terminals to fall under the control of the PH 4 is copied from the call control data master table 231 to the call control data slave table 231. In consequence, it is not necessary to send and receive IP address and other information at all times. This is effective for the processing capacities of the MGC 2 and the PH 4 and the IP-PBX can accommodate a greater number of terminal ports to fall under its control.

Figure 8:
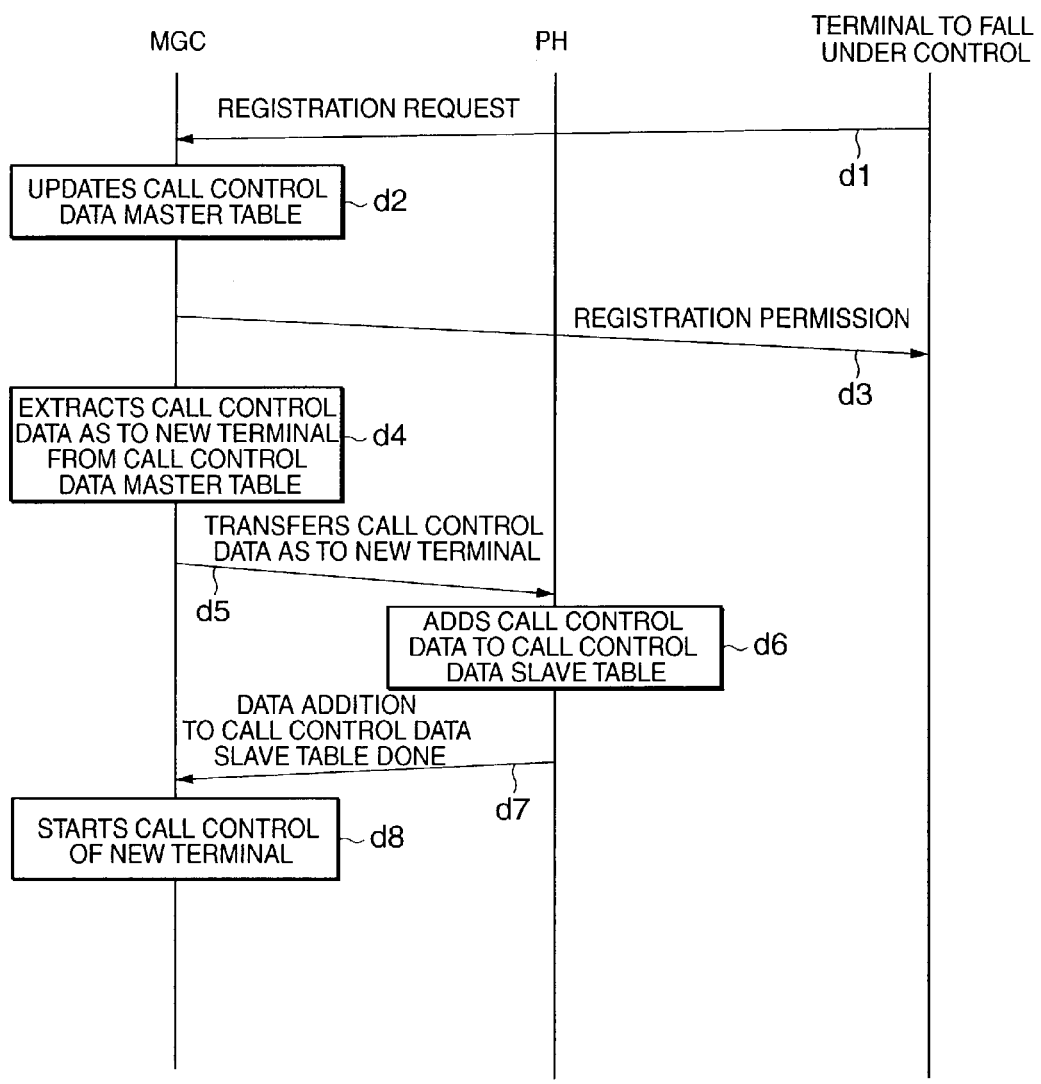
FIG. 8 is a sequence chart of operation of registering a terminal to fall under the control of the IP-PBX with a PH of the IP-PBX according to the first preferred embodiment of the present invention.

FIG. 8 is a sequence chart of operation of registering a terminal to under the control of the IP-PBX with a PH 4 of the IP-PBX 1 according to the first preferred embodiment of the present invention. In other words, FIG. 8 illustrates the procedure of adding data for a terminal to fall under the control to the call control data slave table 231 on a PH after the terminal issues a registration request to the MGC 2.

If for some reason, for example, a new terminal is added to the network and will fall under the control of the IP-PBX, the terminal issues a registration request to the MGC 2. When the MGC 2 receives the registration request from the new terminal to fall under the control of the IP-PBX (d1 of FIG. 8), it adds new call control data to the call control data master table 5 (d2 of FIG. 8), receives the terminal attribute such as its IP address, and grants registration permission to the new terminal to fall under the control of the IP-PBX (d3 of FIG. 8).

At the same time, the MGC selects a PH that conducts call control for the new terminal to fall under the control of the IP-PBX, extracts the call control data as to the new terminal from the call control data master table 231 (d4 of FIG. 8), and transfers that data to the selected PH 4 (d5 of FIG. 8).

Having received that data, the PH 4 adds the data to the call control data slave table 431 (d6 of FIG. 8) and sends the MGC 2 a message that it has added the data to the call control data slave table (d7 of FIG. 8). As the result, the MGC 2 starts call control of the new terminal (d8 of FIG. 8).

Figure 9:
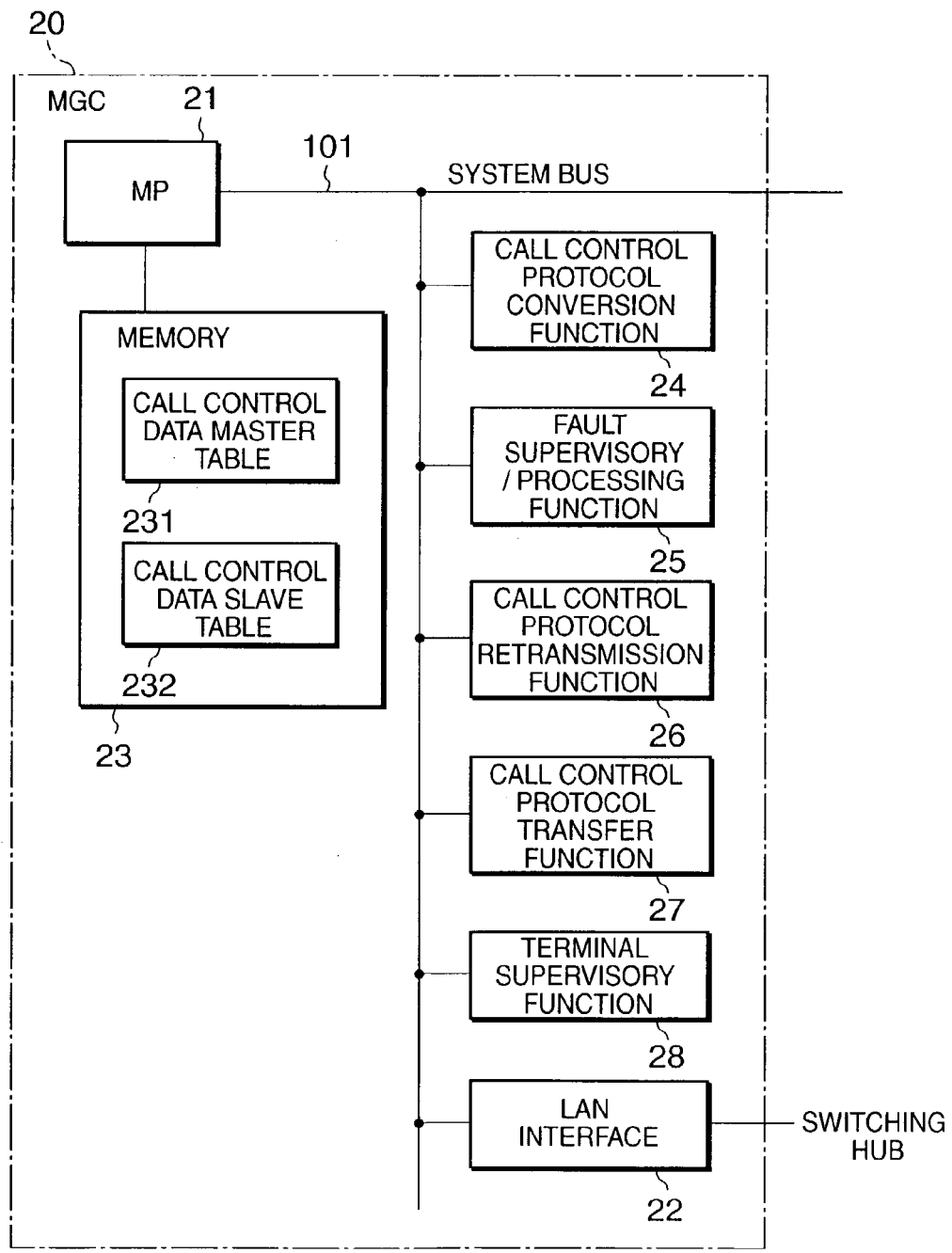
FIG. 9 is a block diagram showing a configuration of the MGC according to a second preferred embodiment of the present invention.

FIG. 9 is a block diagram showing a configuration of the MGC according to a second preferred embodiment of the present invention. In FIG. 9, the MGC 20 according to the second preferred embodiment of the present invention is comprised of a main processor (MP) 21, a LAN interface 22, a memory 23, a call control protocol conversion function 24, a fault supervisory/processing function 25, a call control protocol retransmission function 26, a call control protocol transfer function 27, and a terminal supervisory function 28. In the memory 23, a call control data master table 231 and a call control data slave table 232 are created. The call control protocol conversion function 24, fault supervisory/processing function 25, call control protocol retransmission function 26, call control protocol transfer function 27, and terminal supervisory function 28 perform the same processing tasks as the corresponding call control protocol conversion function 44, fault supervisory/processing function 45, call control protocol retransmission function 46, call control protocol transfer function 47, and terminal supervisory function 48 shown in FIG. 3.

The IP-PBX of the second preferred embodiment of the present invention has the same configuration as the IP-PBX 1 according to the first preferred embodiment of the present invention with the exception that the above-mentioned MGC 20 has replaced the MGC 2. The same components are assigned the same reference numbers.

In the second preferred embodiment of the present invention, as described above, the MGC 20 that performs call control/processing tasks includes the main processor 21, memory 23, and LAN interface, and the memory has the call control data master table 231 that stores call control data such as the phone numbers, IP addresses, and port numbers of all terminals falling under the control of the IP-PBX, coexistent with the call control data slave table 232 that stores call control data as to the terminals falling under the direct control of the main processor 21.

To the system bus 101 inside the MGC 20, the call control protocol conversion function 24, fault supervisory/processing function 25, call control protocol retransmission function 26, call control protocol transfer function 27, and terminal supervisory function 28 are connected, and the main processor 21 controls these functions. The call control protocol conversion function 24, fault supervisory/processing function 25, call control protocol retransmission function 26, call control protocol transfer function 27, and terminal supervisory function 28 may be embodied as either hardware components or software components. If these functions are embodied as software components, they are implemented in this way: after storing a program of code describing the functions into the memory 23, the computer executes the program.

The main processor 21 connects to the LAN interface 22 and the LAN interface 22 connects to the switching hub 5-1 via the LAN 200. The switching hub 5-1 connects to the router 6.

On the other hand, the IP phones 7-1, 7-2 and the IPTA 8 that accommodates non-IP phones 9-1 which are not compliant with IP and attaches IP to them connect to the switching hub 5-2 and the switching hub 5-2 connects to the router 6.

By realizing the above-described configuration, the main processor 21 of the MGC 20 can conduct call control for the IP phones 7-1, 7-2 and the IPTA 8 that accommodates non-IP phones 9-1, 9-2 connected to the LAN 200 as the terminals falling under the control of the IP-PBX, wherein these terminals could be controlled through the use of the PHs 4-1 through 4-4, using the call control data slave table 232, call control protocol conversion function 24, fault supervisory/processing function 25, call control protocol retransmission function 26, call control protocol transfer function 27, terminal supervisory function 28, and LAN interface 22 in the same manner of operation as would be performed with the intervening PHs 4-1 through 4-4. Because call control operation in this embodiment is the same as would be performed with the above PHs 4-1 through 4-4, its explanation is not repeated.

To downsize the PH functions and integrate them into the MGC 2 would be effective for cost reduction when the quantity of terminal ports to fall under the control of the IP-PBX is relatively small. Even if the number of these terminal ports increases afterward, the PHs 4-1 through 4-4 can be added and installed gradually on the system bus 101 or expansion system bus 102, and, thus, excellent scalability can be realized.

Figure 10:
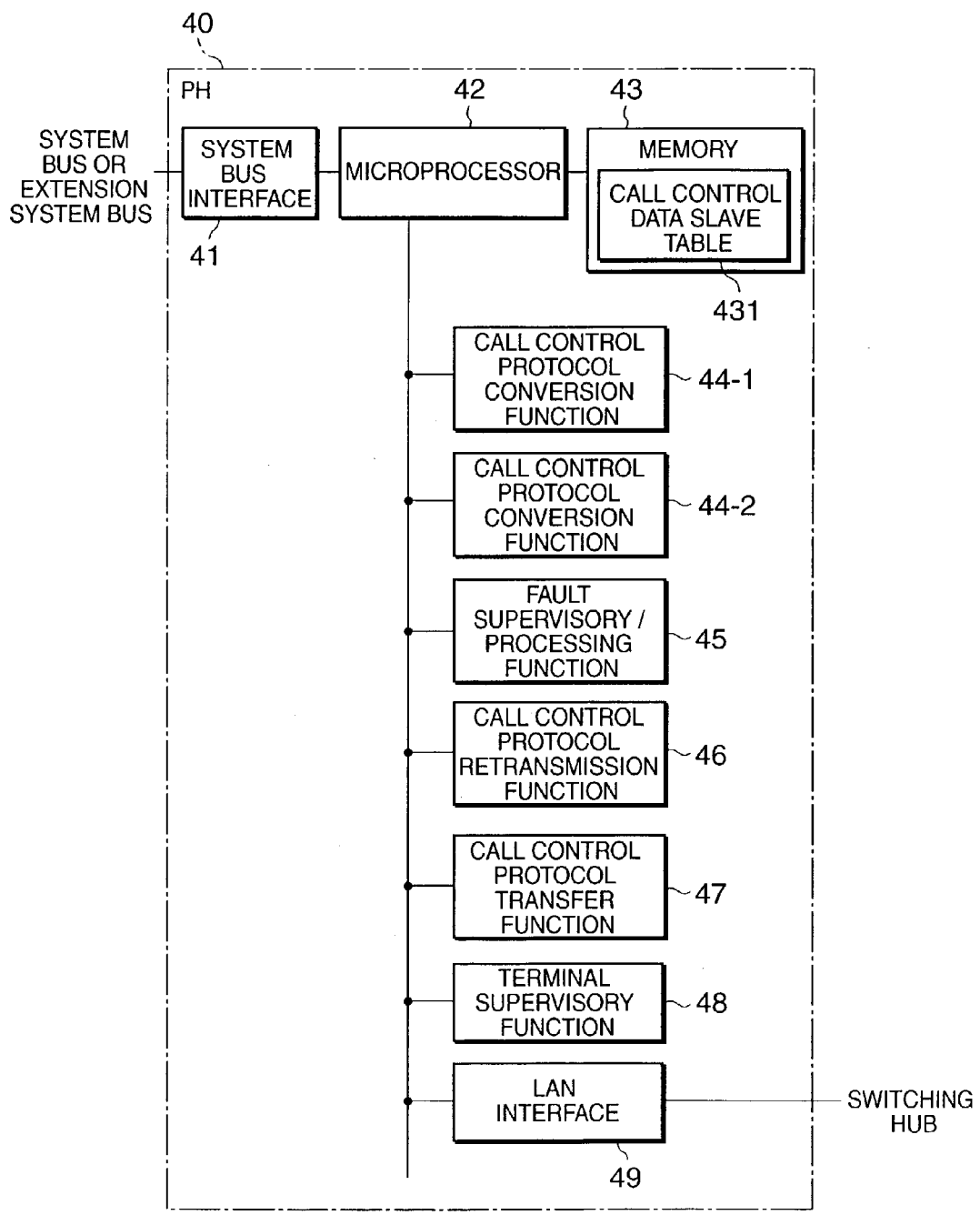
FIG. 10 is a block diagram showing a configuration of a PH according to a third preferred embodiment of the. present invention.

FIG. 10 is a block diagram showing a configuration of a PH according to a third preferred embodiment of the present invention. In FIG. 10, the PH 40 according to the third preferred embodiment of the present invention has the same configuration as the PH 4 shown in FIG. 3 in accordance with the first preferred embodiment of the present invention with the exception of inclusions of a plurality of call control protocol conversion functions 44-1 and 44-2. The same components are assigned the same reference numbers.

The plurality of call control protocol conversion functions 44-1 and 44-2 are arranged to each handle different protocols supported by different terminals falling under the control of the IP-PBX. Thus, the PH 40 accommodates two terminal specific protocols. These call control protocol conversion functions 44-1 and 44-2 as well as other function in the PH 40 may be embodied as either hardware components or software components. If these functions are embodied as software components, they are implemented in this way: after storing a program of code describing the functions into the memory 43, the computer executes the program.

Call control operation in accordance with the third preferred embodiment of the present invention is essentially the same as in the foregoing first preferred embodiment of the present invention, and, therefore, its explanation is not repeated. In the third preferred embodiment of the present invention, even if the IP phone 7-1 and the IP phone 7-2 use different protocols, it is possible to process two terminal specific protocols by executing protocol conversion, for example, using the call control protocol conversion function 44-1 of the PH 4-4 for a control procedure to be performed between the MGC 2 and the IP phone 7-1 and using the call control protocol conversion function 44-2 of the PH 4-4 for a control procedure to be performed between the MGC 2 and the IP phone 7-2. In other words, in circumstances where a plurality of different protocols be used among terminals, the number of terminal ports to fall under the control of the IP-PBX can be expanded flexibly without protocol change within the main processor 21.

Figure 11:
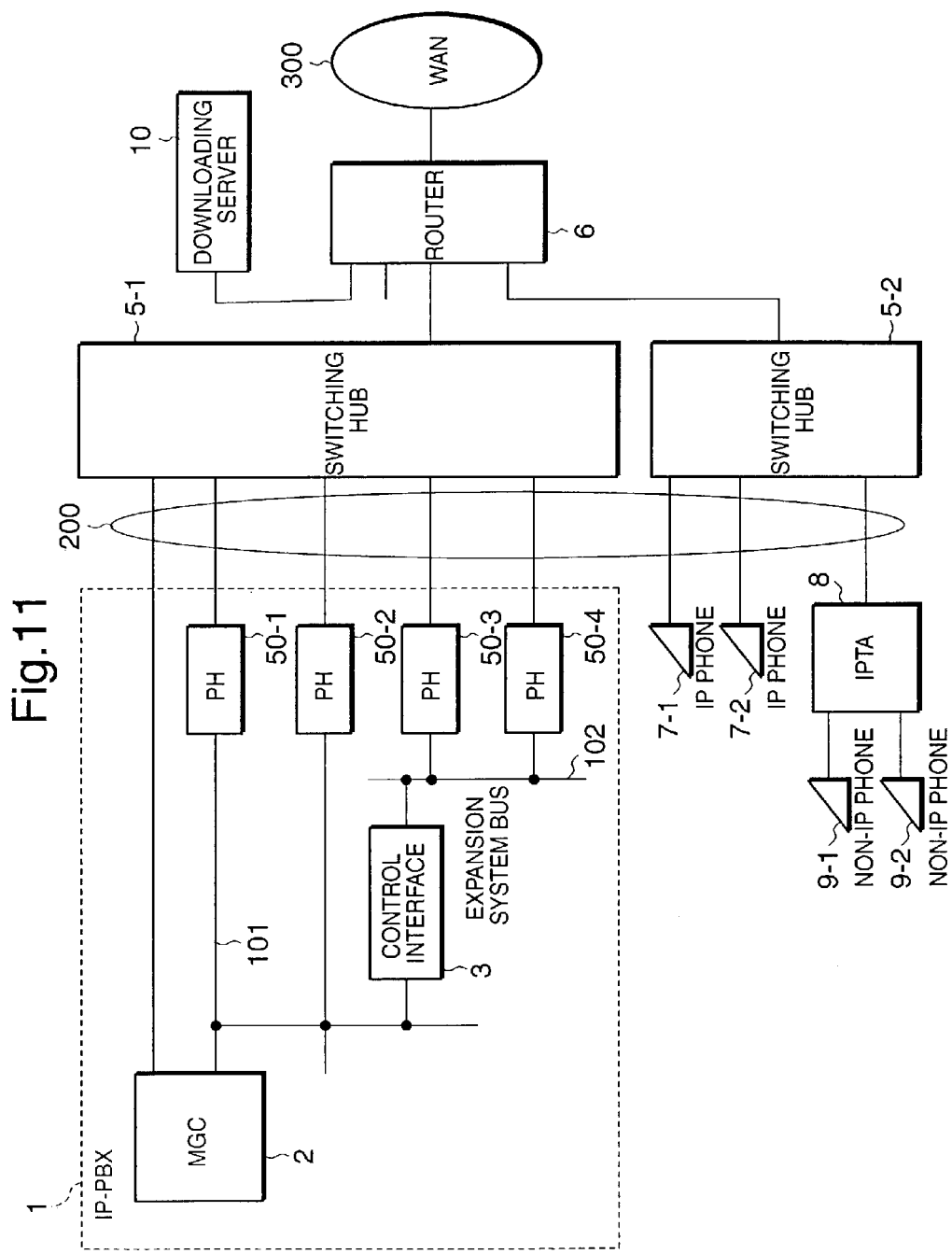
FIG. 11 is a block diagram showing s system configuration according to a fourth preferred embodiment of the present invention.

FIG. 11 is a block diagram showing s system configuration according to a fourth preferred embodiment of the present invention. In FIG. 11, the fourth preferred embodiment of the present invention has the same configuration as the system configuration shown in FIG. 1 in accordance with the first preferred embodiment of the present invention with the exception that a downloading server 10 is added to the system and PHs 50-1 through 50-4 are installed. The same components are assigned the same reference numbers.

Figure 12:
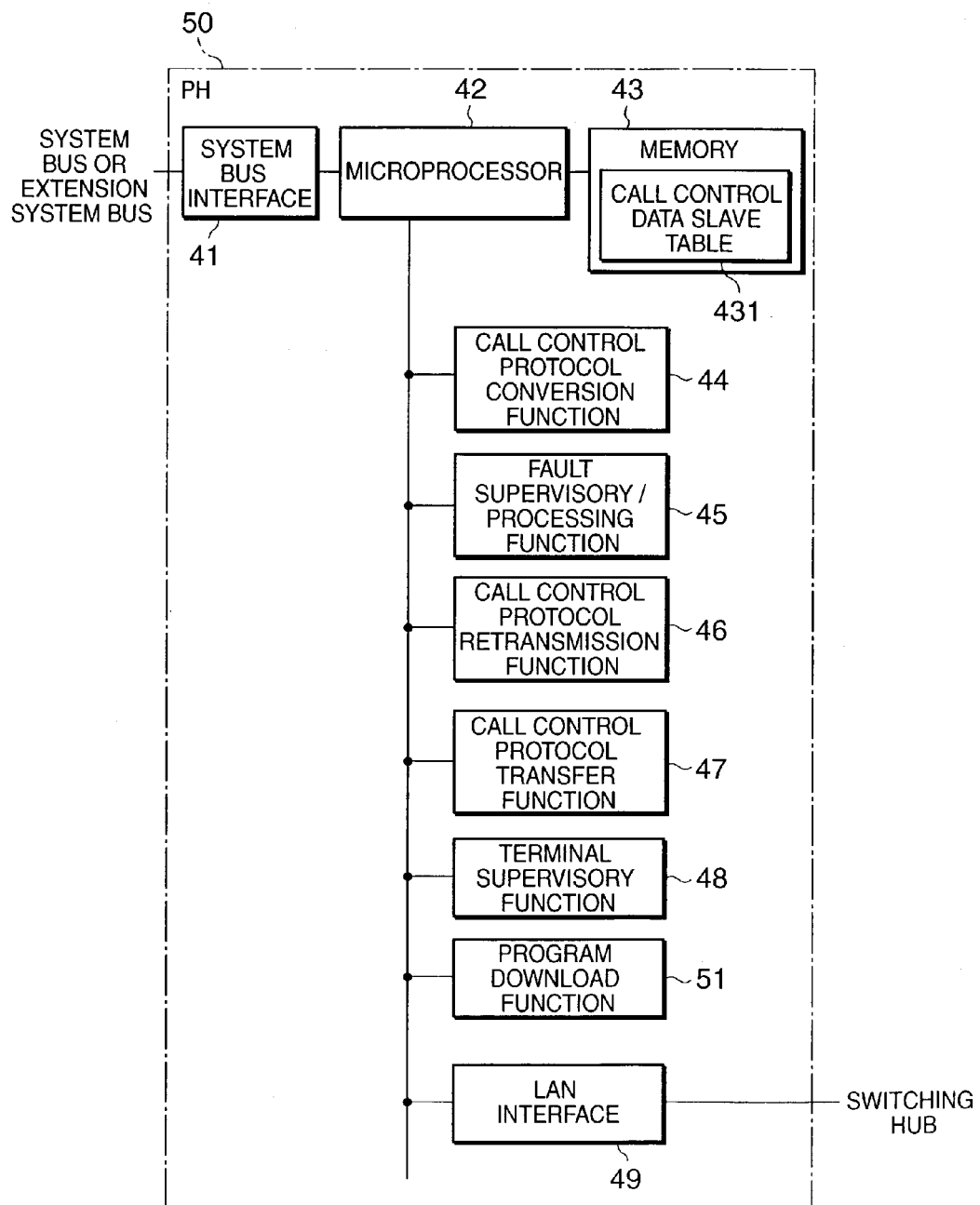
FIG. 12 is a block diagram showing a configuration of a PH in FIG. 11.

FIG. 12 is a block diagram showing a configuration of one of the PHs 50-1 through 50-4 in FIG. 11. In FIG. 12, the PH 50 has the same configuration as the PH 4 shown in FIG. 3 in accordance with the first preferred embodiment of the present invention with the exception of an inclusion of a program download function 51. The same components are assigned the same reference numbers.

In FIG. 12, the internal configuration of the PH 50, representative of the PHs 50-1 through 50-4, is shown, and it will be appreciated that the PHs 50-1 through 50-4 have the same configuration as the PH 50. The download function 51 as well as other functions in the PH 50 may be embodied as either hardware components or software components. If these functions are embodied as software components, they are implemented in this way: after storing a program of code describing the functions into the memory 43, the computer executes the program.

Call control operation in accordance with the fourth preferred embodiment of the present invention is essentially the same as in the foregoing first preferred embodiment of the present invention, and, therefore, its explanation is not repeated. In the fourth preferred embodiment of the present invention, under command of the main processor 21, the program download function 51 requests the downloading server 10 on the network to supply a new program to be used and, after downloading the program and storing it into the memory, notifies the main processor 21 of the downloading termination, and after a reboot, call control restarts. Although the downloading server 10 is connected to the router 6 in FIG. 11, it may be connected to a switching hub or other network connection equipment, and network devices to which this server connects are not limited to the above-mentioned ones.

When a new terminal specific protocol which has been known, but has not been installed in the PH 50 is required for registering or removing a terminal falling under the control of the IP-PBX with or from the PH 50, a necessary program can be downloaded online, thereby making it possible to bring out the processing capacity of the PH 50 to the maximum. Also, when terminals are added to the network in circumstances a plurality of different protocols be used among the terminals, as described in the third preferred embodiment of the present invention, a new terminal specific protocol can be added to the PH 50. It is thus possible to expand the number of terminal ports to fall under the control of the IP-PBX, allowing diverse types of terminal specific protocols to coexist in the IP-PBX 1.

Figure 13:
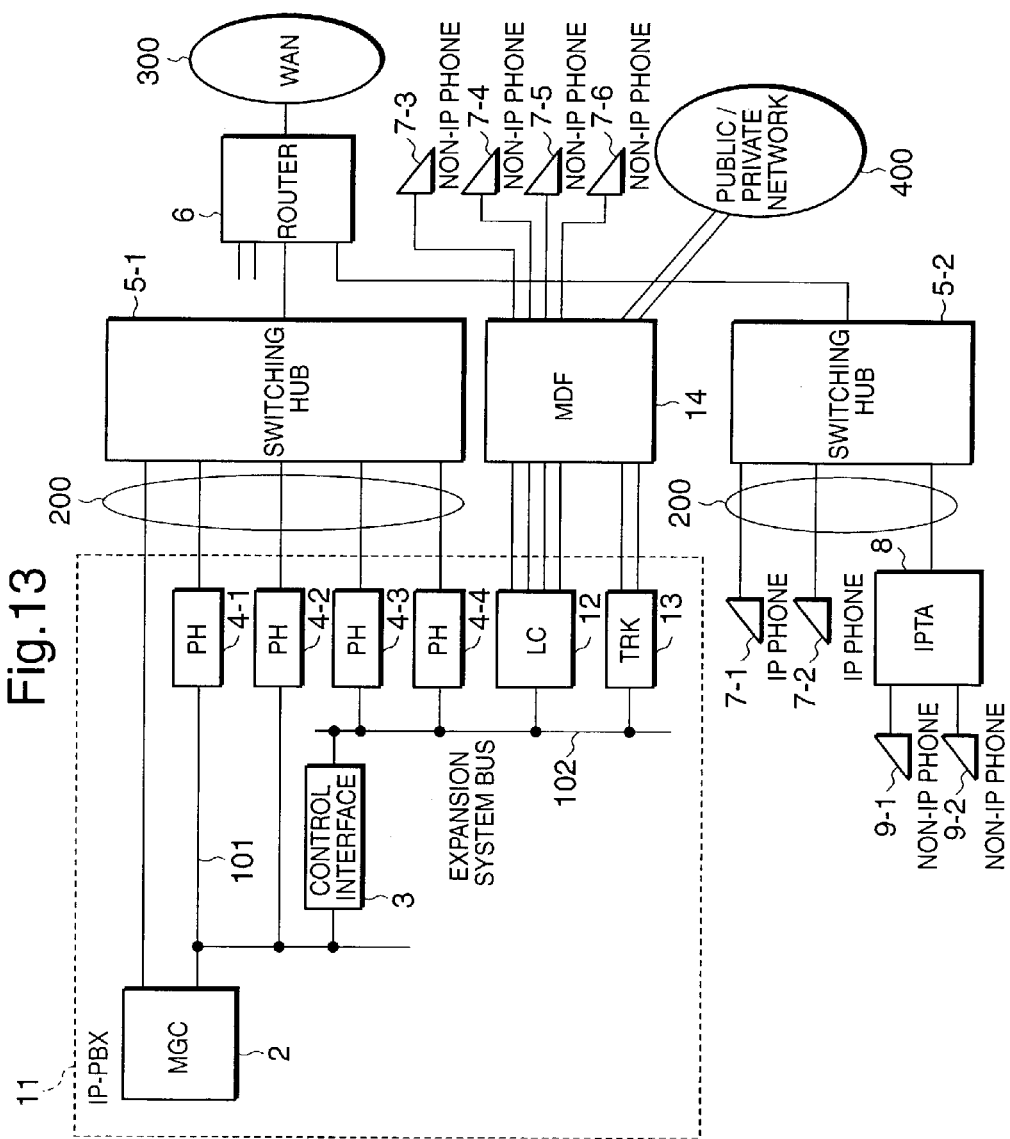
FIG. 13 is a block diagram showing a system configuration according to a fifth preferred embodiment of the present invention.

FIG. 13 is a block diagram showing a system configuration according to a fifth preferred embodiment of the present invention. In FIG. 13, the IP-PBX 11 system of the fifth preferred embodiment of the present invention has the same configuration as the system configuration of the first preferred embodiment of the present invention, shown in FIG. 1, with the exception that the IP-PBX 11 has been arranged such that a line circuit (LC) 12 and a trunk circuit (TRK) 13 which accommodates circuits not connecting to the LAN 200 are connected to the system bus 101 or the expansion system bus 102 of the MGC 2. The same components are assigned the same reference numbers.

The line circuit 12 connects to non-IP phones 9-3 through 9-6 which are not compliant with IP via a Main Distribution Frame (MDF) 14 and the trunk circuit 14 connects to a public/private network 400 via the MDF 14.

Figure 14:
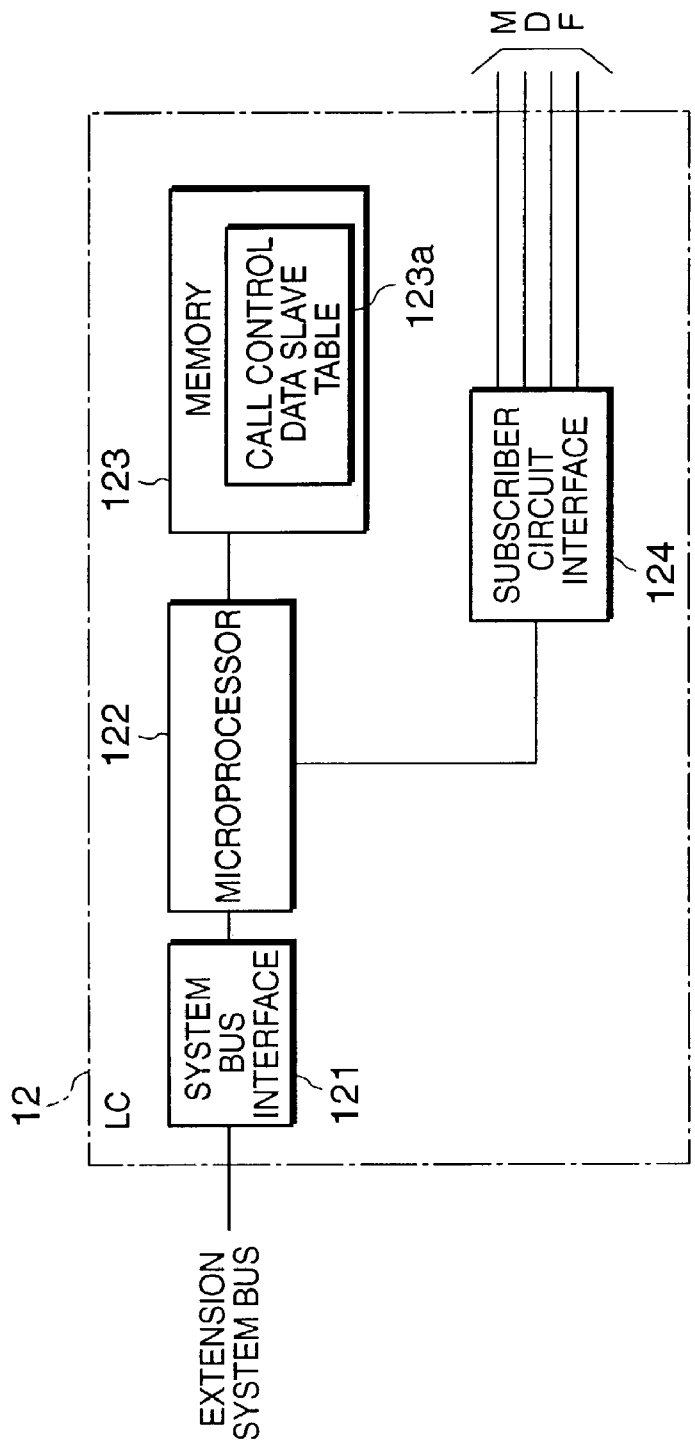
FIG. 14 is a block diagram showing a configuration of a line circuit in FIG. 13.

FIG. 14 is a block diagram showing a configuration of the line circuit 12 in FIG. 13. In FIG. 14, the line circuit 12 is comprised of a system bus interface 121, a microprocessor 122, a memory 123, and a subscriber circuit interface 124.

In the line circuit 12, the system bus interface 121 connecting to the system bus 10 in order to allow the line circuit to coexist with the PHs 4-1 through 4-4 is connected to the microprocessor 122. The microprocessor 122 operates with the memory 123 and the memory 123 includes a call control data slave table 123*a*. The call control data slave table 123*a* is structured so that the upper limit to the number of terminals that can be controlled by the line circuit 12 will be greatest.

Also, to the microprocessor 122, the subscriber circuit interface 124 is connected and non-IP phones 9-3 through 9-6 are connected via the subscriber circuit interface 124 and MDF 14.

Figure 15:
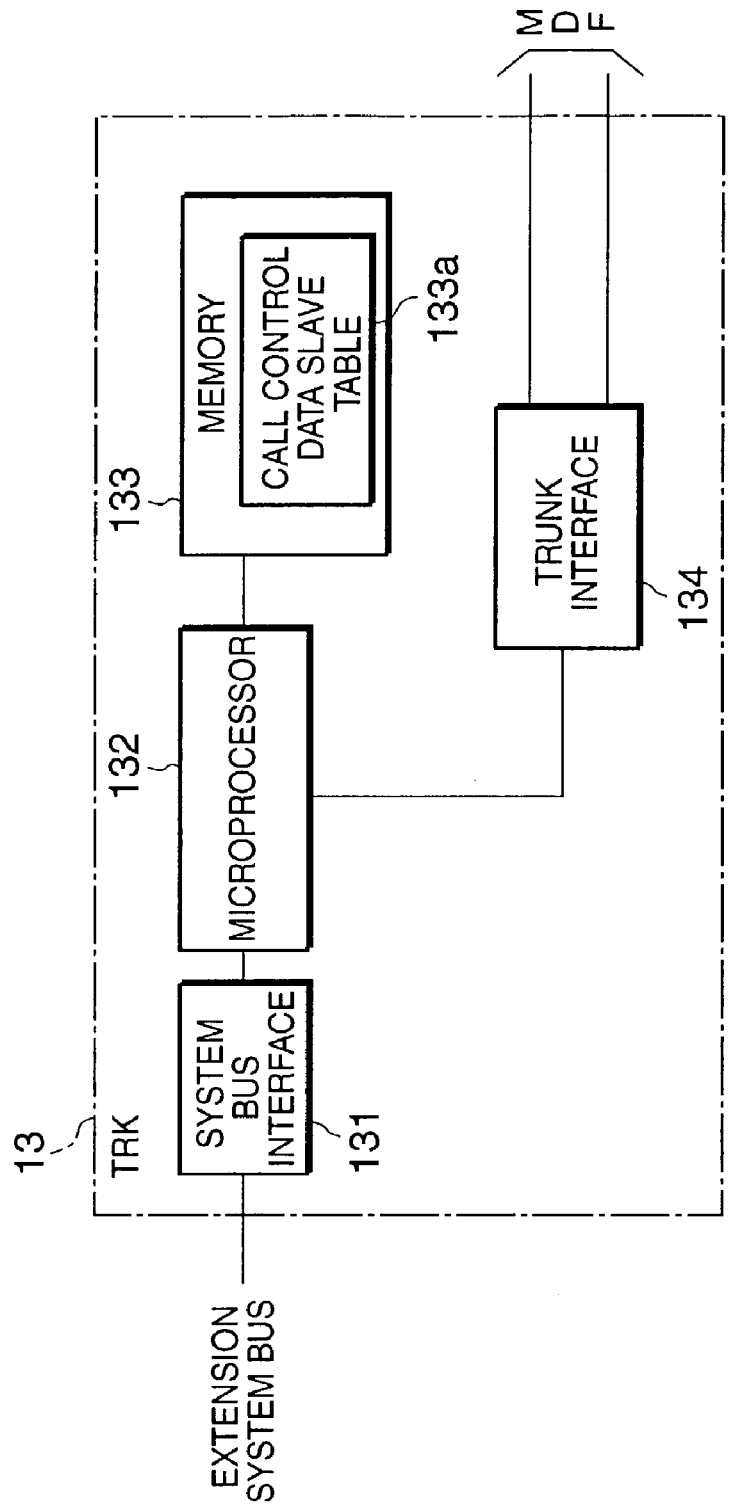
FIG. 15 is a block diagram showing a configuration of a trunk circuit in FIG. 13.
Figure 16:
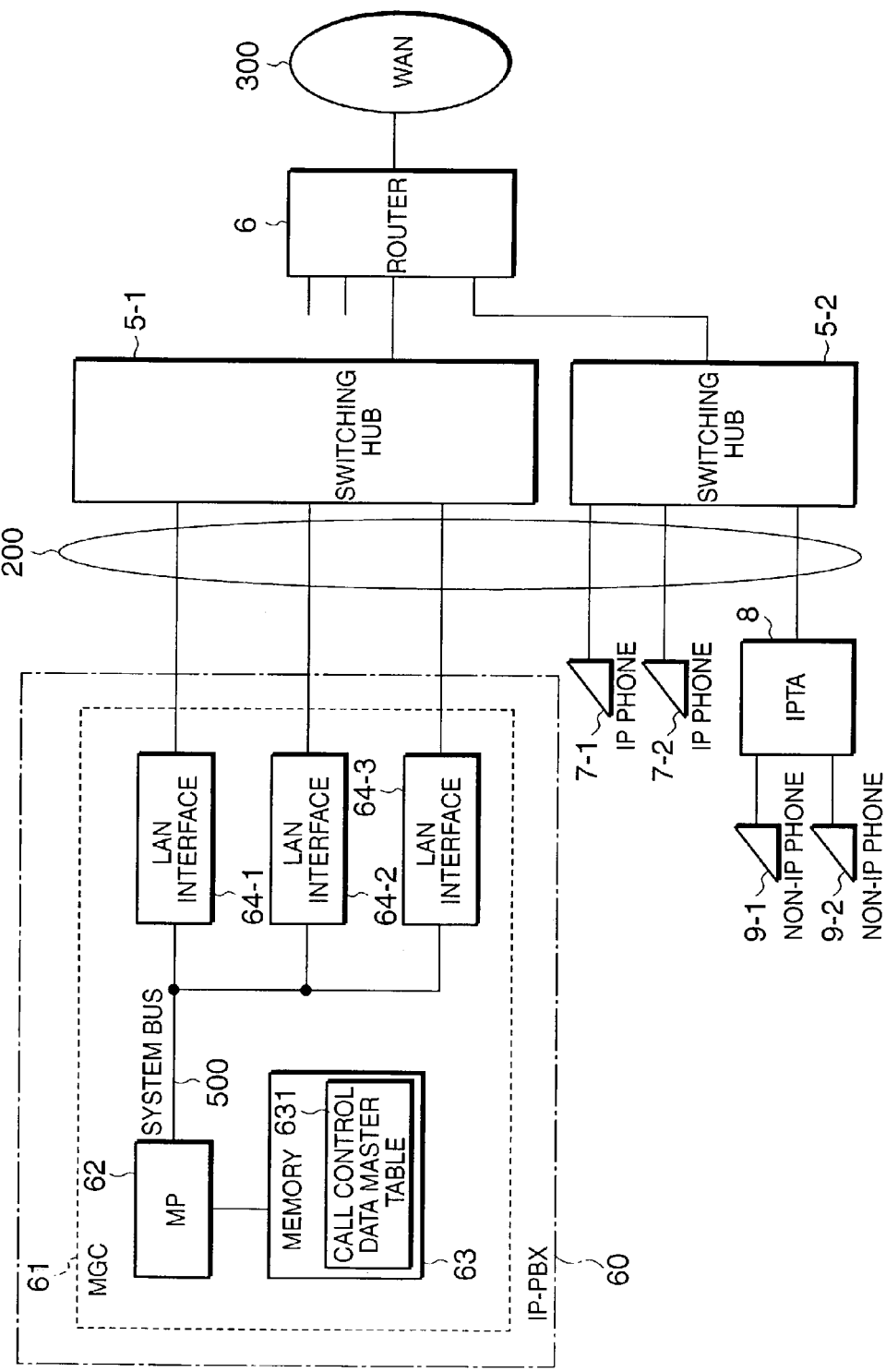
FIG. 16 is a bock diagram showing a system configuration of a prior art IP-PBX.

FIG. 15 is a block diagram showing a configuration of the trunk circuit 13 in FIG. 13. In FIG. 15, the trunk circuit 13 is comprised of a system bus interface 131, a microprocessor 132, a memory 133, and a trunk interface 134.

In the trunk circuit 13, the system bus interface 131 connecting to the system bus 102 is connected to the microprocessor 132 that controls the trunk circuit 13. The microprocessor 132 operates with the memory 133 and the memory 133 includes a call control data slave table 133*a*. The call control data slave table 133*a* is structured so that the upper limit to the number of terminals that can be controlled by the trunk circuit 13 will be greatest.

Also, to the microprocessor 132, the trunk interface 134 is connected and the public/private network 400 is connected via the trunk interface 134 and MDF 14.

By realizing the above-described configuration, wherein, particularly, the trunk circuit 13 has the same call control data slave table 133*a* as the call control data slave table existing in the PHs 4-1 through 4-4, the main processor 21 of the MGC 2 can control the line circuit 12. and trunk circuit 13, using the same protocol as the protocol for controlling the PHs 4-1 through 4-4. Operations that differ from the first preferred embodiment of the present invention will be explained below.

When a non-IP phone 9-3 offers an origination attempt, the subscriber circuit interface 124 detects this state change and the microprocessor 122 of the line circuit 12 transfers the origination attempt and information to the main processor 21. When routing an incoming call to the non-IP phone 9-3, the main processor 21 issues a command for termination processing for the call to the microprocessor 122 of the line circuit 12 and the microprocessor 122 commands the subscriber circuit interface 124 to perform the termination processing. The subscriber circuit interface 124 sends a ringing signal to the non-IP phone 9-3 to make its bell sound.

On the other hand, for a call incoming from the public/private network 400, the trunk interface 134 of the trunk circuit detects this state change and the microprocessor 132 of the trunk circuit 13 transfers the termination to the main processor 21. When routing an originated call to the public/private network 400, the main processor 21 issues a command for origination processing to the microprocessor 132 of the trunk circuit 13 and the microprocessor 132 commands the trunk interface 134 to perform the origination processing. The trunk interface 134 sends an origination signal to the public/private network 400.

Thus, the call procedure between the MGC 2 and the PH 4-4 for a call outgoing/incoming to/from a non-IP phone 9-1 accommodated by the IPTA 8, wherein call control/processing is performed via a PH 4-4, and the call procedure between the MGC 2 and the line circuit 12 for a call outgoing/incoming to/from the non-IP phone 9-3 accommodated by the line circuit 12 can be controlled by the same protocol.

This is also true for the trunk circuit 13; that is, the same protocol sequence can be performed between the MGC 2 and the trunk circuit 13 as the protocol between the MGC 2 and the PH 4-4. Thus, a suitable terminal accommodation method can be selected flexibly and the number of terminal ports to fall under the control of the IP-PBX can be expanded.

As described hereinbefore, in the present invention, the IP-PBX 1 may include the PHs 4-1 through 4-4, 50-1 through 50-4 that execute protocol control processing including protocol conversion for call control/processing by the MGC 2, the PHs being installed on the system bus 101 of the MGC 2 that performs call control/processing tasks or the expansion system bus 102 provided by the control interface 3. Thereby, the number of terminal ports that fall under the control of the IP-PBX and can be accommodated by the MGC 2 can be expanded in a larger scale and with lower costs than before. In the present invention, therefore, by installing the PHs 4-1 through 4-4, 50-1 through 50-4, when appropriate, it is economically feasible to expand the number of terminal ports to fall under the control of the IP-PBX in a scalable manner from a small scale to a large scale.

Also, in the present invention, increase in the load on the MGC 2 with expansion in the number of terminal ports to fall under the control of the IP-PBX is minimized. At the same time, even in circumstances where a plurality of different protocols be used among terminals, the IP-PBX is able to accommodate the terminals without imposing a load on the MGC 2. Thus, the IP-PBX is capable of flexibly accommodating various types terminals by carrying out the following: downloading a necessary program to the PHs 4-1 through 4-4, 50-1 through 50-4; copying call control data to the call control data slave tables 431 during a boot; and adding data to the appropriate call control data slave table 431 when the IP-PBX accommodates an additional terminal.

Also, in the present invention, the same protocol applies to both the call procedure between the MGC 2 and each of the PHs 4-1 through 4-4, 50-1 through 50-4 accommodating IP phones 7-1, 7-2 and IPTA 8 and the call procedure between the MGC 2 and the line circuit 12 or the trunk circuit 13. Thus, the protocol processing load on the MGC 2 is reduced and a flexible system configuration can be realized.

As described hereinbefore, an IP compliant private branch electronic exchange of the present invention includes protocol handlers that execute, at least, protocol control processing for call control/processing by the multimedia gateway controller that performs call control/processing tasks, the protocol handlers being installed on either the system bus connected to the multimedia gateway controller or the expansion system bus provided by the control interface for expanding the system bus. Thus, such an advantageous effect can be produced that expansion in the number of terminal ports to fall under the control of the IP-PBX can be accomplished economically and in a scalable manner from a small scale to a large scale.

Also, another IP compliant private branch electronic exchange of the present invention is arranged such that the protocol handlers execute a plurality of processing tasks for transferring a plurality of different call control protocols, according to the attribute and type of terminals to fall under the control of the IP-PBX and a call control protocol can be selected per terminal to fall under the control. Thus, such an advantageous effect can be produced that the IP-PBX is capable of flexibly accommodating various types of terminals.

Furthermore, yet another IP compliant private branch electronic exchange of the present invention further includes a line circuit which supervises and controls phones accommodated by it via the main distribution frame under the control of the multimedia gateway controller and a trunk circuit which supervises and controls trunks accommodated by it via the main distribution frame under the control of the multimedia gateway controller. At least either the line circuit or the trunk circuit is connected to either the system bus or the expansion system bus provided by the control interface. The protocol interface between at least either the line circuit or the trunk circuit and the multimedia gateway controller is compatible with the protocol interface between the multimedia gateway controller and each protocol handler. Thus, such an advantageous effect can be produced that the protocol processing load on the multimedia gateway controller can be reduced and a flexible system configuration can be realized.

While this invention has been described with reference to a certain preferred embodiment, it is to be understood that the subject matter encompassed by the invention is not limited to this specific embodiment. Instead it is intended for the subject matter of the invention to include all such alternatives, modifications and equivalents as can be included within the spirit and scope of the following claims.

What is claimed is:

1. An Internet Protocol compliant private branch electronic exchange which conducts switching control of terminals falling under its control, the terminals being connected to a Local Area Network (LAN), and sending and receiving Internet Protocol packets for a call through said LAN, comprising:

a multimedia gateway controller, which is connected to said LAN and performs call-control-processing tasks for said switching control, includes:
   a call control data master table for storing call control data of all of said terminals falling under control of the exchange; and a plurality of protocol handlers which are installed on a system bus connected to said multimedia gateway controller and connected to said LAN, each of said protocol handlers includes:
   a call control data slave table for storing call control data of specified number of said terminals selected and transferred by said multimedia gateway controller, wherein the specified number is an upper limit of the number of terminals which can be controlled by each respective protocol handler,
   terminal supervisory means for performing terminal supervision which supervises proper performance of said terminals specified in said call control data slave table by periodically transmitting a packet for supervision after said call control data slave table has been created and after sessions to said terminals specified in said call control data slave table have been set up,
   call control protocol transfer means for sending and receiving said Internet Protocol packets of call control for said terminals specified in said call control data slave table,
   fault supervisory/processing means for executing fault event supervision, fault processing and retransmission of layer 1 through 3 while said call control protocol transfer means performing sending and receiving said Internet Protocol packets of call control for said terminals specified in said call control data slave table, and call control protocol conversion means for converting a protocol of said Internet Protocol packets for communication with said terminal into a call control protocol applied within said multimedia gateway controller for said multimedia gateway controller to perform the call-control-processing tasks and vice versa for call procedures between said multimedia gateway controller and said terminal, wherein said terminal supervisory means and said fault supervisory/processing means perform said terminal supervision and said fault event supervision, fault processing and retransmission of layer 1 through 3 in place of said multimedia gateway controller.

2. The Internet Protocol compliant private branch electronic exchange, as claimed in claim 1, wherein:

said call control data stored in said call control data master table and said call control data slave table includes, at least, phone numbers, Internet Protocol addresses, port numbers of said terminals falling under the control of the exchange.

3. The Internet Protocol compliant private branch electronic exchange, as claimed in claim 1, wherein:

said call control transfer means provided in said protocol handler includes a function to cope with a plurality of different call control protocols according to an attribute and type of said terminal falling under the control of the exchange.

4. The Internet Protocol compliant private branch electronic exchange, as claimed in claim 1, wherein:

each of said protocol handlers further includes program download means for receiving and activating downloaded programs which can handle new protocols from a downloading server over said LAN during an online call process for incorporating a capability of handling additional protocols into said protocol handler.

5. The Internet Protocol compliant private branch electronic exchange, as claimed in claim 1, further comprising:

line interface means which are installed on said system bus and connects telephone lines of non-IP telephones and trunk lines of a public/private network which is not compliant with Internet Protocol via a main distribution frame, said line interface means includes a call control data slave table for storing call control data for terminals corresponding to said telephone lines and said trunk lines connected to said line interface means, signal interface means for supervising a signal on said line, and for converting said signal on said line into a call control protocol for the call-control-processing tasks performed by said multimedia gateway controller and vice versa for call procedures between said multimedia gateway controller and said terminal corresponding to said telephone line and said trunk line connected to said line interface means.

6. The Internet Protocol compliant private branch electronic exchange, as claimed in claim 2, further comprising control interface means which is connected to said multimedia gateway controller through said system bus for providing an expansion system bus which expands said system bus for installing additional said protocol handlers.

7. A method for expanding the number of terminal ports to fall under the control of an Internet Protocol compliant private branch electronic exchange which conducts switching control of terminals falling under its control, the terminals being connected to a Local Area Network (LAN), and sending and receiving Internet Protocol packets for a call through said LAN, comprising:

a step of storing call control data of all of said terminals falling under control of the exchange in a call control data master table provided in a multimedia gateway controller which is connected to said LAN and performs call-control-processing tasks for said switching control; and a step of installing a plurality of protocol handlers on a system bus connected to said multimedia gateway controller, and providing connections to said LAN, wherein each of said protocol handlers performs the following steps of:

a step of creating a call control data slave table in said protocol handler by storing call control data of specified number of said terminals selected and transferred by said multimedia gateway controller, wherein the specified number is an upper limit of the number of terminals which can be controlled by said protocol handler;

a step of performing terminal supervision which supervises proper performance of said terminals specified in said call control data slave table by periodically transmitting a packet for supervision after said call control data slave table has been created and after sessions to said terminals specified in said call control data slave table have been set up;

a step of sending and receiving said Internet Protocol packets of call control for said terminal specified in said call control data slave table;

a step of executing fault event supervision, fault processing and retransmission of layer 1 through 3 while sending and receiving said Internet Protocol packets of call control for said terminal specified in said call control data slave table; and a step of converting a protocol of said Internet Protocol packets for communication with said terminal into a call control protocol applied within said multimedia gateway controller for said multimedia gateway controller to perform the call-control-processing tasks and vice versa for call procedures between said multimedia gateway controller and said terminal, wherein, said step of performing terminal supervision and said step of executing fault event supervision, fault processing and retransmission of layer 1 through 3 is performed in said protocol handler in place of said multimedia gateway controller.

8. The method as claimed in claim 7, wherein said step of creating a call control data slave table in said protocol handler further comprising:

a step of copying a part of the contents of said call control data master table for specific terminals which are selected and transferred by said multimedia gateway controller, wherein, said call control data stored in said call control data master table and said call control data slave table includes, at least, phone numbers, Internet Protocol addresses, port numbers of said terminals falling under the control of the exchange.

9. The method as claimed in claim 7, further comprising:

a step of installing line interface means on said system bus, and connecting telephone lines of non-IP telephones and trunk lines of a public/private network which is not compliant with Internet Protocol via a main distribution frame, said line interface means includes a call control data slave table for storing call control data for terminals corresponding to said telephone lines and said trunk lines connected to said line interface means,
wherein said line interface means performs the following steps of:
a step of sending/receiving a signal on said line; and
a step of converting said signal on said line into a call control protocol for the call-control-processing tasks performed by said multimedia gateway controller and vice versa for call procedures between said multimedia gateway controller and said terminal corresponding to said telephone line and said trunk line connected to said line interface means.

10. The method as claimed in claim 2, further comprising a step of providing an expansion system bus which expands said system bus connected to said multimedia gateway controller for installing additional said protocol handlers.

* * * * *

UNITED STATES PATENT AND TRADEMARK OFFICE
CERTIFICATE OF CORRECTION

PATENT NO. : 7,580,402 B2  Page 1 of 1
APPLICATION NO. : 10/409139
DATED : August 25, 2009
INVENTOR(S) : Masuhiro et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1645 days.

Signed and Sealed this

Fourteenth Day of September, 2010

David J. Kappos
*Director of the United States Patent and Trademark Office*